US012656024B2

(12) United States Patent
Tian et al.

(10) Patent No.: US 12,656,024 B2
(45) Date of Patent: Jun. 16, 2026

(54) METHOD FOR PRODUCING PLASMONIC-NANOSTRUCTURE SPECTRALLY SELECTIVE SOLAR ABSORBER HAVING HIGH SOLAR ABSORPTANCE, LOW THERMAL EMITTANCE, AND HIGH THERMAL STABILITY

(71) Applicant: Northeastern University, Boston, MA (US)

(72) Inventors: Yanpei Tian, Boston, MA (US); Yi Zheng, Canton, MA (US)

(73) Assignee: Northeastern University, Boston, MA (US)

( * ) Notice: Subject to any disclaimer, the term of this patent is extended or adjusted under 35 U.S.C. 154(b) by 580 days.

(21) Appl. No.: 18/070,742

(22) Filed: Nov. 29, 2022

(65) Prior Publication Data

US 2023/0168006 A1 Jun. 1, 2023

Related U.S. Application Data

(60) Provisional application No. 63/283,792, filed on Nov. 29, 2021.

(51) Int. Cl.
| | |
|---|---|
| *F24S 70/225* | (2018.01) |
| *B82Y 40/00* | (2011.01) |
| *C23F 1/36* | (2006.01) |
| *C23F 1/38* | (2006.01) |
| *F24S 20/20* | (2018.01) |
| *F24S 70/12* | (2018.01) |

(52) U.S. Cl.
CPC ............ *F24S 70/225* (2018.05); *B82Y 40/00* (2013.01); *C23F 1/36* (2013.01); *C23F 1/38* (2013.01); *F24S 20/20* (2018.05); *F24S 70/12* (2018.05)

(58) Field of Classification Search
None
See application file for complete search history.

(56) References Cited

U.S. PATENT DOCUMENTS

| | | | | | |
|---|---|---|---|---|---|
| 4,002,541 | A | * | 1/1977 | Streander | ................. B64C 1/38 |
| | | | | | 205/213 |
| 4,074,706 | A | * | 2/1978 | Hajdu | .................... F24S 70/60 |
| | | | | | 126/663 |

(Continued)

FOREIGN PATENT DOCUMENTS

| | | | | | |
|---|---|---|---|---|---|
| EP | | 1688683 | A1 * | 8/2006 | ............ F24S 10/753 |
| GB | | 2102025 | A * | 1/1983 | ............. F24S 70/25 |
| WO | WO-2012057073 | A1 * | 5/2012 | | .............. C25D 1/00 |

*Primary Examiner* — Jorge A Pereiro
(74) *Attorney, Agent, or Firm* — Foley Hoag LLP; Dana M. Gordon; John D. Lanza

(57) ABSTRACT

A method is disclosed for producing a plasmonic-nanostructure spectrally selective solar absorber having high solar absorptance, low thermal emittance, and superior thermal stability. The method includes the steps of providing an alloy structure containing a base metal and a copper alloying impurity, wherein copper has a weight percent concentration in the alloy of at least 0.25%; and applying an alkaline solution to a surface of the alloy structure to selectively dissolve base metal elements at the surface resulting in fabrication of sponge-like copper nanostructures on the surface configured to scatter, trap, and absorb light in solar wavelengths.

20 Claims, 18 Drawing Sheets

(56) References Cited

U.S. PATENT DOCUMENTS

| 4,309,257 | A | * | 1/1982 | Epstein | ................. | F24S 70/225 |
| | | | | | | 205/333 |
| 4,582,111 | A | * | 4/1986 | Kuehn | .................... | F24S 70/25 |
| | | | | | | 164/46 |
| 6,441,223 | B1 | * | 8/2002 | Franczyk, II | ......... | C07F 9/3813 |
| | | | | | | 558/111 |
| 9,840,789 | B2 | * | 12/2017 | Zhang | ..................... | H01M 4/80 |
| 11,280,006 | B2 | * | 3/2022 | Kim | .......................... | A61F 2/30 |
| 2012/0055591 | A1 | * | 3/2012 | Kamat | ................... | C22C 21/14 |
| | | | | | | 148/551 |
| 2013/0230717 | A1 | * | 9/2013 | Xia | .......................... | B22F 9/24 |
| | | | | | | 428/397 |
| 2017/0107627 | A1 | * | 4/2017 | Kim | .......................... | A61F 2/28 |
| 2019/0040520 | A1 | * | 2/2019 | Krammer | ............... | F24S 70/30 |

* cited by examiner

Table 1

$\bar{\alpha}$, $\bar{\epsilon}$, and $\eta_{pho\rightarrow th}$ of PNSSAs before and after thermomechanical stability tests.

| Thermal test | Pristine | 200 °C | | | | 2 h annealing | | | | Mechanical test |
| --- | --- | --- | --- | --- | --- | --- | --- | --- | --- | --- |
| | | 48 h | 96 h | 192 h | 100 °C | 200 °C | 300 °C | 400 °C | |
| $\bar{\alpha}$ | 0.942 | 0.942 | 0.934 | 0.937 | 0.929 | 0.934 | 0.941 | 0.935 | 0.928 |
| $\bar{\epsilon}$ | 0.078 | 0.034 | 0.025 | 0.029 | 0.043 | 0.062 | 0.053 | 0.038 | 0.043 |
| $\eta_{pho\rightarrow th}$ | 83.4% | 85.6% | 85.3% | 85.4% | 83.1% | 83.5% | 83.5% | 84.7% | 83.1% |

FIG. 6

METHOD FOR PRODUCING PLASMONIC-NANOSTRUCTURE SPECTRALLY SELECTIVE SOLAR ABSORBER HAVING HIGH SOLAR ABSORPTANCE, LOW THERMAL EMITTANCE, AND HIGH THERMAL STABILITY

STATEMENT AS TO FEDERALLY SPONSORED RESEARCH

This invention was made with government support under Grant No. 1941743 awarded by the National Science Foundation. The government has certain rights in the invention.

CROSS REFERENCE TO RELATED APPLICATION

This application claims priority from U.S. Provisional Patent Application No. 63/283,792 filed on Nov. 29, 2021 entitled SELECTIVE LEACHING ALLOY FOR PLASMONIC SOLAR ABSORPTION AND INFRARED SUPPRESSION, which is hereby incorporated by reference.

BACKGROUND

The present application relates generally to methods for producing plasmonic-nanostructure spectrally selective solar absorbers having high solar absorptance, low thermal emittance, and superior thermal stability.

BRIEF SUMMARY OF THE DISCLOSURE

Cost-effective and spectrally selective solar absorbers that possess high solar absorptance, low thermal emittance, and superior thermal stability are essential for photothermal conversion applications, e.g., industrial heating, solar desalination, photothermal catalysis, and concentrating solar power systems. Various embodiments disclosed herein relate to using a selective leaching reaction for transfiguring broad-spectrum and highly reflective aluminum alloys into plasmonic-nanostructure selective solar absorbers (PNSSAs). Enabled by surface plasmon resonance, this technique forms a copper nanostructured thin film on an alloy mirror, which provides tunable manipulation of the spectral selectivity, high and omnidirectional solar absorptance (0.94 from 0 to 60°), low thermal emittance (0.03 at 100° C.), and excellent thermomechanical stability. Featured with merits of competitive performance of spectral selectivity, the feasibility of solution-processed fabrication, and cost-effectiveness of raw materials and chemicals, selective-leaching-alloy to achieve PNSSAs is a promising and universal approach for achieving high photothermal efficiency (85%) of solar thermal energy harvesting. The technique can also be used with other metal alloys, such as steel and superalloys, and extends its applications to fabricating mid- and high-temperature selective solar absorbers.

A method in accordance with one or more embodiments is disclosed for producing a plasmonic-nanostructure spectrally selective solar absorber having high solar absorptance, low thermal emittance, and superior thermal stability. The method includes the steps of: providing an alloy structure containing a base metal and a copper alloying impurity, wherein copper has a weight percent concentration in the alloy of at least 0.25%; and applying an alkaline solution to a surface of the alloy structure to selectively dissolve base metal elements at the surface resulting in fabrication of sponge-like copper nanostructures on the surface configured to scatter, trap, and absorb light in solar wavelengths.

A plasmonic-nanostructure spectrally selective solar absorber is disclosed in accordance with one or more embodiments having high solar absorptance, low thermal emittance, and superior thermal stability. The solar absorber comprises an alloy structure containing a base metal and a copper alloying impurity, wherein copper has a weight percent concentration in the alloy of at least 0.25%. The alloy structure has sponge-like copper nanostructures on a surface thereof configured to scatter, trap, and absorb light in solar wavelengths. The copper nanostructures are formed on the surface by applying an alkaline solution to the surface to selectively dissolve base metal elements at the surface, resulting in fabrication of the copper nanostructures.

BRIEF DESCRIPTION OF THE DRAWINGS

FIG. 1A is a schematic showing a solution-processed chemical reaction for fabricating Cu nanostructures on the alloy surface by selective leaching. FIG. 1B is a schematic showing the mechanism of selective leaching. FIG. 1C is a schematic showing the enhanced solar absorptance and suppressed thermal emittance of the PNSSAs. FIG. 1D is a photographs demonstrating large-scale PNSSAs (30 cm×30 cm) fabricated on a 2024 alloy sheet. The inset shows the color change of the 2024 alloy sheet (left) and PNSSAs (right). The scale bar of the inset is 2 cm. FIG. 1E shows the hemispherical reflectance of the PNSSAs and 2024 alloy. It also depicts the reflectance spectra of the black absorber and ideal SSAs, AM 1.5 solar spectrum, and blackbody thermal spectra at 50 and 100° C.

FIG. 2E shows EDS elements mapping of the PNSSAs surface. FIG. 2F shows an XRD spectrum of the 2024 alloy, PNSSAs, and extracted Cu nanostructures. FIG. 2G shows the working mechanism of the PNSSAs with broadband visible and near-IR absorptance and high mid-IR reflectance. FIG. 2H shows a cross-section electrical field magnitude distribution at visible (400 nm) and near-IR (800, 1000, and 2500 nm) regions.

FIG. 3A shows simulated spectra of 800 nm thick isolated Cu nanoparticles thin film. FIG. 3B shows simulated spectra of 800 nm thick Cu nanoparticles thin film with 1 μm back-coated Al film.

FIG. 3C shows simulated reflectance spectra varying with the nanoparticles diameter, d and the thickness of Cu nanoparticles layer, t. FIGS. 3D-3F show reflectance spectra, FIGS. 3G-3I show $\alpha$, $\varepsilon$, and $\eta_{pho-th}$, and FIGS. 3J-3L show size distributions of Cu nanostructure features of the PNSSAs prepared by various concentrations of NaOH (aq), different reaction times, and temperatures.

FIG. 4A shows reflectance spectra of the PNSSAs after 48, 96, and 192 h of thermal stability tests in argon at 200° C. FIG. 4B shows XRD spectra of pristine and thermal-treated Cu nanostructures at 200° C. for 192 h. FIG. 4C shows SEM images (top view) of PNSSAs after 48, 96, and 192 h of thermal stability tests in argon at 200° C. The scale bars are 500 nm. FIG. 4D shows reflectance spectra and FIG. 4E shows AFM topographies of PNSSAs after 2 h thermal treatment at temperatures of 100, 200, 300, and 400° C. in argon, the units of x-, y-, and z-axis are μm. FIG. 4F shows reflectance spectra of PNSSAs before and after mechanical adhesion test for 5 times.

FIG. 5A shows an experimental set-up comprising a solar simulator, a focus lens, and a vacuum chamber equipped with a turbo vacuum pump. FIG. 5B shows the temperature response of the PNSSAs, commercial SSAs, and black absorber under 1 sun irradiance. FIG. 5C shows the steady-state temperatures of the absorbers under weak sunlight (0.5 and 0.8 kW m$^{-2}$) and concentrated solar intensities (2, 3, 4, and 5 kW m$^{-2}$). FIG. 5D shows the photothermal performance of the absorbers over a solar cycle from sunrise to sunset under varying ambient temperature. FIG. 5E shows the photothermal efficiency of PNSSAs as functions of concentration factors and operating temperatures. FIG. 5F shows the reflectance spectrum of the treated 7075 Al alloy showing spectral selectivity.

FIG. 6 shows Table 1.

DETAILED DESCRIPTION

Figure 1B:
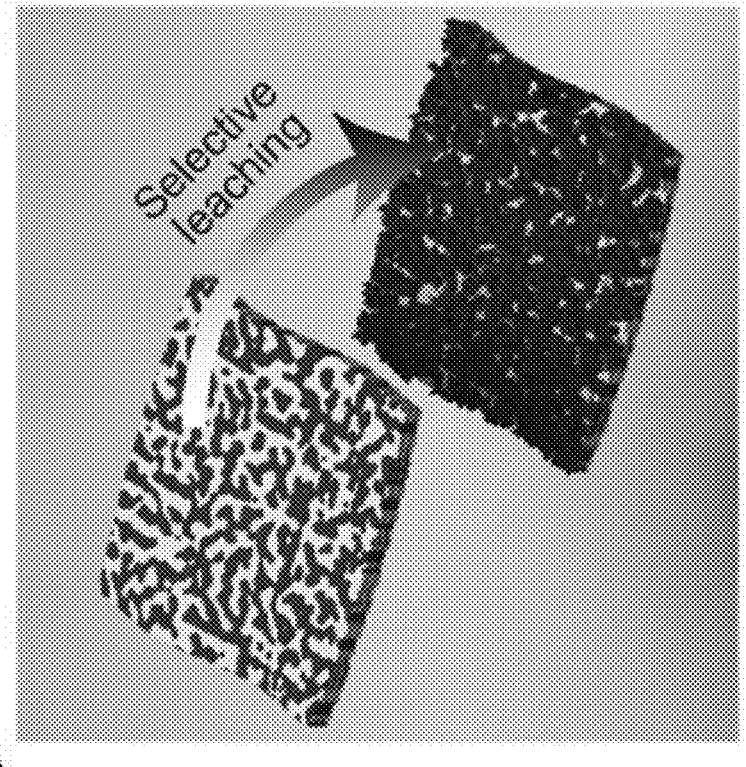
FIGS. 1A-1E illustrate an exemplary process for fabricating the PNSSAs through selective leaching in accordance with one or more embodiments.
Figure 1A:
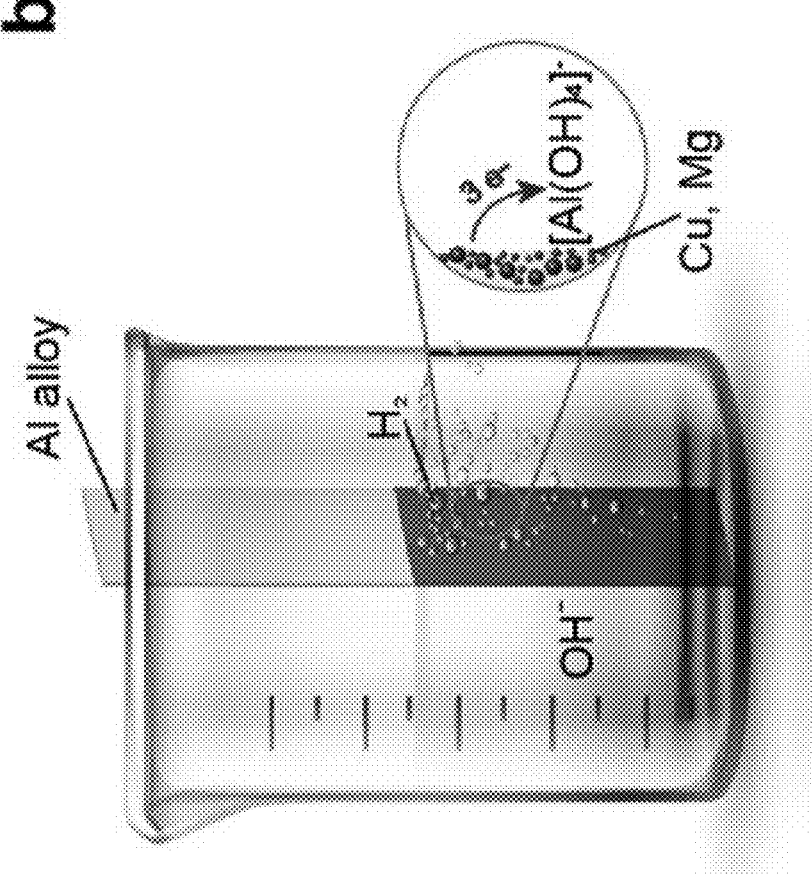
Figure 1D:
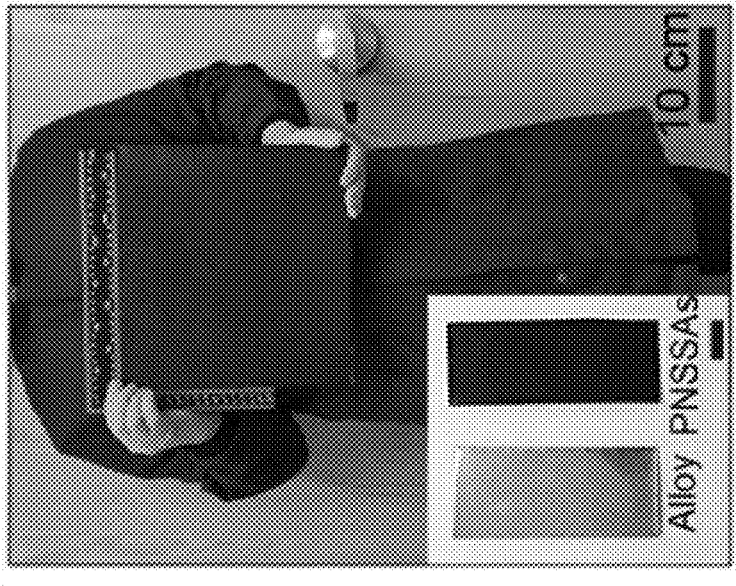
Figure 1C:
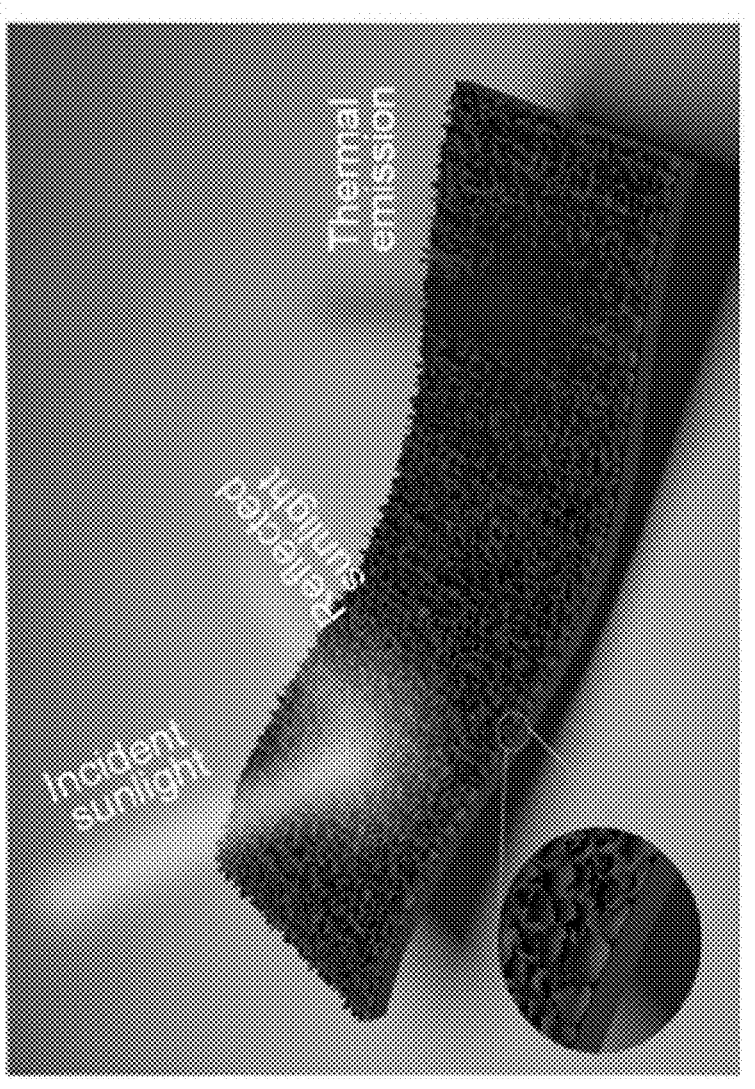
Figure 1E:
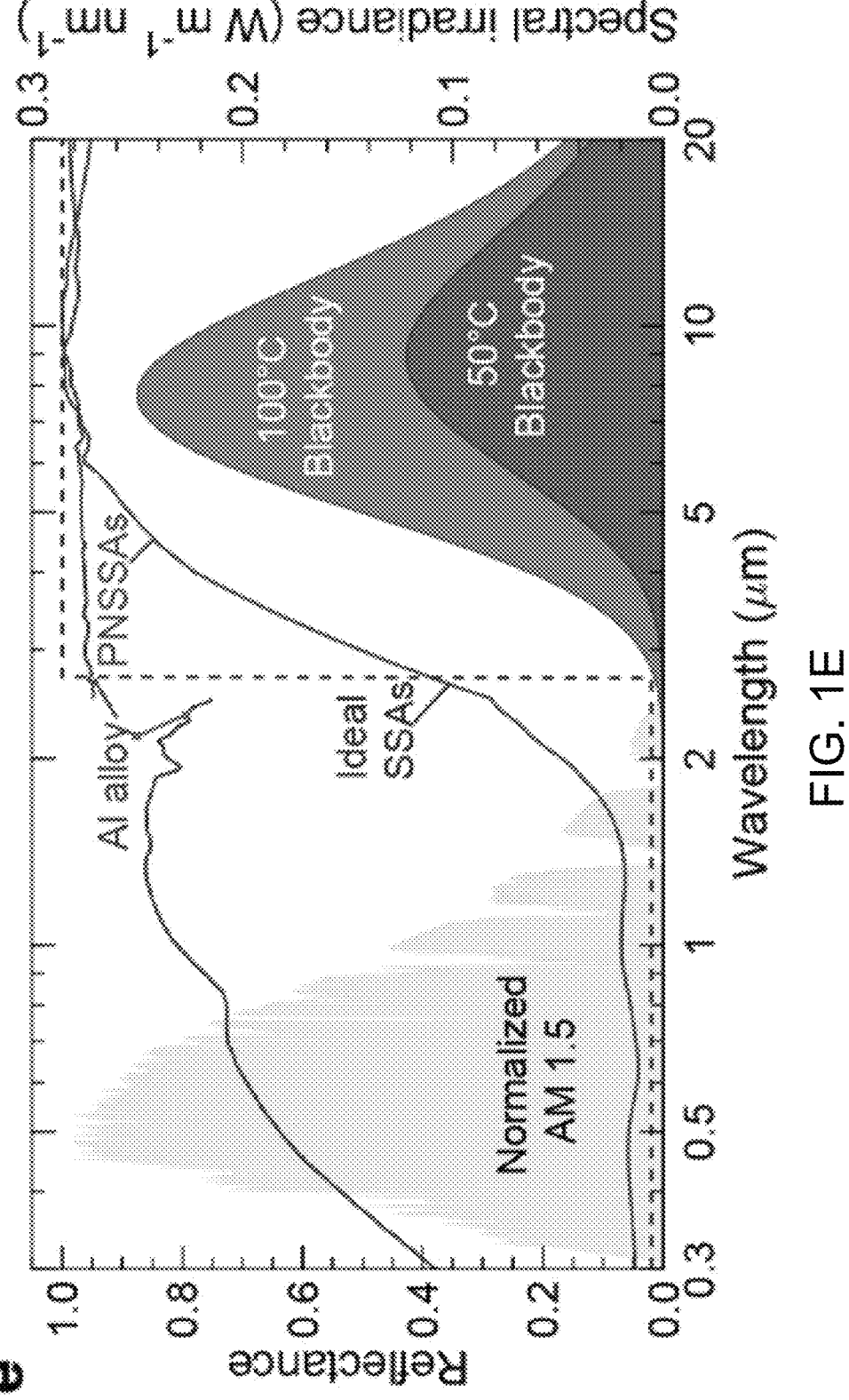
Figures 1F, 1G:
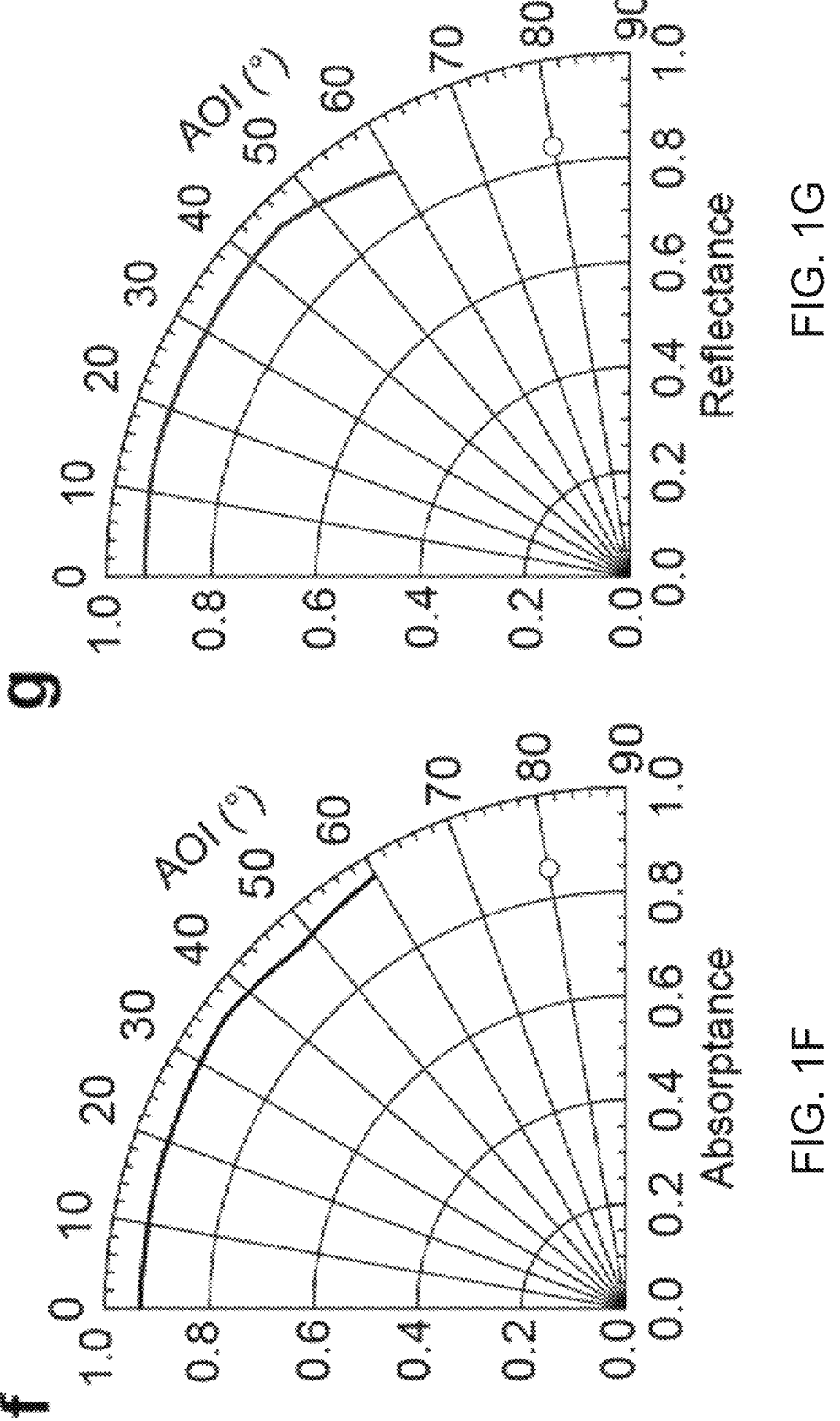
FIGS. 1F and 1G show the overall solar absorptance and infrared reflectance of PNSSAs across angles leading to omnidirectional solar absorption and thermal suppression. The circles represent the simulated solar absorptance and infrared reflectance at an extended angle of 80°, respectively.

To mitigate global warming, fossil fuels are being increasingly phased out and replaced by renewable energy technologies, such as solar energy, with attractive attributes of zero carbon and air-pollutant emissions [1-3]. Solar energy harvesting can be accomplished via means of photovoltaic electricity generation [4,5], thermochemical or photochemical energy storage in fuels (e.g., H$_2$) [6,7], solar thermal conversion (solar thermoelectrics, thermophotovoltaics and steam generation) [8-11]. Among these technologies, solar-thermal conversion is the most promising approach on account of its broadband solar spectrum harvesting, higher energy conversion efficiency, and scalable deployment [12-16]. It can generate heat for low-temperature (<200° C.) applications, such as space and water heating [17], desalination [18,19], photothermal catalysis [20], while solar heating for mid (200-600° C.) and high (>600° C.) temperatures can be utilized to drive concentrated solar power systems [21,22], solar-thermoelectric generators [23,24], and solar thermophotovoltaics [25,26]. An ideal solar absorber with spectral selectivity is critical to maximizing photothermal efficiency, $\eta_{pho-th}$, of these solar thermal systems, defined by [27]:

$$\eta_{pho-th} = \acute{\alpha} - \acute{\varepsilon}\frac{\sigma\left(T_{abs}^4 - T_{amb}^4\right)}{CF \cdot Q_{abs}} \qquad (1)$$

where $\acute{\alpha}$ and $\acute{\varepsilon}$ denote the solar absorptance and thermal emittance, respectively; CF represents the concentration factors, and Q$_{abs}$ stands for the heat flux of AM 1.5 (ASTM G173, 1000 W m$^{-2}$=1 sun) solar spectrum; σ means the Stefan-Boltzmann constant; T$_{abs}$ and T$_{amb}$ are temperatures of solar absorber and ambient, respectively. When the operating temperature of a solar absorber increases, the spontaneous thermal radiation, $T_{abs}^4$, rises rapidly, counteracting the absorbed solar heating power. For instance, a 100° C. blackbody radiates thermal energy at 1099 W m$^{-2}$ ($\cong$1 sun), while it jumps to a irradiance intensity that is equivalent to 20 suns when it is at 500° C. The key parameter for achieving high $\eta_{pho-th}$ is fabricating spectral selective solar absorbers (SSAs) possessing high absorptance over the solar bandwidth (0.3-2.5 μm) to maximize solar heating and low emittance within the infrared thermal wavelengths (2.5-25 μm) to suppress radiative heat loss. Furthermore, maintaining superior thermal stability at elevated operating temperatures is also vital for high $\eta_{pho-th}$ at concentrated solar irradiance. For opaque SSAs, $\varepsilon$ equals 1−R, where R represents the spectral reflectance, which is a step function with cut-off wavelengths, $\lambda_{cut-off}$, that shifts at the near-infrared (near-IR) wavelengths according to the operating temperature and concentrating factors [28]. Such a step function has a unity absorptance from 0.3 μm to the $\lambda_{cut-off}$, which covers solar irradiance wavelengths as much as possible and a zero emittance for the mid-infrared (mid-IR) range starting from the $\lambda_{cut-off}$, to the ending wavelengths of the blackbody emission spectrum [13]. Thus, it is significant to design SSAs whose spectral selectivity is easily tunable to suit diverse operating situations. Moreover, scalable fabricating cost-effective solar absorbers with high solar absorptance, low thermal emittance, and superior thermal stability remains challenging.

Tremendous efforts have been devoted in recent decades to fabricate SSAs with distinct designs. Generally, SSAs include multilayered metal-dielectric stacks [29-33], ceramic-metal composites [34-36], plasmonic nanostructures [37-39], and photonic crystals [40,41] classified based on their spectral manipulation strategies. For instance, the structure of metal nanoparticles embedded into the dielectric excites plasmon resonances and contributes to the high solar absorptance of cermet SSAs [42]. The underlying metal substrate results in low thermal emittance for those structures. The broadband solar absorptance of multilayer stacks consisting of metal and dielectric thin films is associated with the anti-reflection effect or cavity resonance [43]. Despite the significant progress of the aforementioned strategies in demonstrating spectral selectivity through architecting structures of metals and dielectrics, challenges remain regarding cost, ease of fabrication, and the availability of sophisticated manufacturing instruments. The fabrication of these SSAs involves high-vacuum thin film deposition [28-30, 34-36, 43] and photolithographic processes [40, 41], often limiting large-scale production. To develop a simple and scalable fabrication process, a new strategy of preparing cost-effective, efficient, and durable SSAs is urgently needed.

An alloy is an atomic mixture of several metal elements, forming a substance with enhanced properties, such as strength or hardness. It consists of one primary or base metal and other metallic or non-metallic constituents. In the conventional selective leaching process, the electro-chemically active elements in an alloy are selectively dissolved to form sponge-like nanostructures composed almost entirely of the inert base constituent(s) [44, 45]. Metallic porous nanostructures with black or gray colors are particularly attractive for selective solar absorption due to their large internal surface area and effective scattering, trapping, and absorbing in solar wavelengths. The photothermal effect as a consequence of the interaction between sunlight and such nanostructures results in heat generation. Contrasting Mandal's work of fabricating SSAs using a galvanic-displacement-reaction-based technique to deposit copper (Cu) nanoparticles on Zinc (Zn) substrate [37], in this work, we employ the low-cost aluminum (Al) alloy as the scaffold and use the alkaline medium as the selective-leaching solution to remove the Al residuals and form Cu nanostructures.

In accordance with various embodiments, a facile, solution-processed, and cost-efficient strategy is provided for fabricating plasmonic-nanostructure selective solar absorbers (PNSSAs) with omnidirectional spectral selectivity, superior thermal stability for over 192 h at 200° C., and high-temperature insensitivity up to 400° C. PNSSAs are derived from selectively leaching away the Al elements from the Al alloy using a hot alkaline solution, while the remaining Cu spontaneously forms a surface nanostructured layer on the alloy surface. The full-spectrum solar absorptance is ascribed to the excitation of surface plasmonic resonance of Cu nanostructures with a broad size distribution enhanced by the multiple reflection and absorption occurring within the nanoporous Cu structures [37], which yields a wide-angle and high solar absorptance peaking at 0.96. The structure of lossy Cu nanostructures forming on the alloy surface inherits the feature of high infrared reflectance from the Al substrate, rendering a low thermal emittance of 0.03. Here, the thermal emittance is characterized to a 100° C. blackbody in the following sections unless otherwise specified. The cut-off wavelength of spectral selectivity of PNSSAs can be easily adjusted by varying the selective leaching reaction parameters, e.g., solution concentrations, temperatures, and reaction times. The selective leaching strategy is also compatible with other alloys with higher-temperature stability, such as stainless steels and superalloys, by electrochemical selective etching, for solar thermal systems working at mid and high-temperature. The anti-oxidation coating such as $SiO_2$, $Al_2O_3$, and $HfO_2$, can be an alternative to enhance its thermal stability at high temperatures. The proposed PNSSAs can be fabricated through scalable solution-processed approach with a lab-scale cost of only 0.735 USD $m^{-2}$. Moreover, this strategy does not rely on complicated and expensive vacuum deposition and photolithographic techniques, allowing easy integration into industrial-scale roll-to-roll processes.

Fabrication and Optical Characterization of PNSSAs

FIG. 1 illustrates an exemplary fabrication process of the PNSSAs and their optical characterizations in accordance with one or more embodiments. 2024 Al alloy contains Cu as the primary alloying impurity. By immersing 2024 Al alloy sheets into 40° C. NaOH (aq) for 40 s, the reaction of $2Al+2NaOH+6H2O \rightarrow 2Na[Al(OH4)]+3H2 \uparrow$ occurs and the Al matrix is dissolved into the solution (FIG. 1A). This chemical treatment selectively dissolves the Al element near the outer surface of the alloy sheet, leaving behind a surface of nanosized Cu grains (FIG. 1B), which appears as dark patches against the shiny Al background, providing high solar absorption (FIGS. 1C-1D). The top Cu nanostructure layer is lossy to the infrared thermal radiation due to the large discrepancy between infrared wavelengths and the thickness and feature size of the Cu nanostructure layer. The underlying Al alloy substrate is highly reflective to the infrared wavelengths, so the combined structure of Cu nanostructures on top Al alloy has a low thermal emittance, effectively suppressing its infrared radiation (FIG. 1C). The silver-white Al surface is transformed to be black (FIG. 1D) with selective optical performance as revealed by the reflectance measurement (FIG. 1E). The PNSSAs indicates a superior spectral selectivity ($\alpha$=0.94 and $\bar{\varepsilon}$=0.03) contrasting the full-spectrum high reflectance of pristine alloy surface (FIG. 1E). The diffused Cu nanostructure layer shows excellent omnidirectional absorption of sunlight from all angles of incidence (AOI), which eliminates the cost associated with solar tracking systems (FIG. 1F). It even exhibits a solar absorptance of 0.85 at a large AOI of 80° and guarantees efficient solar energy harvesting at a large oblique angle, i.e., during the period of sunrise and sunset or in areas of high latitudes. The thermal emittance of PNSSAs is also angle-independent even at a large angle ($\bar{\varepsilon}$=0.17), which illustrates the suppression of infrared thermal radiation for the whole hemisphere space (FIG. 1G). The optical performance of PNSSAs is remarkable considering its facile and scalable fabrication, demonstrated by the large-area PNSSAs samples (FIG. 1D).

Material Characterization and Surface Plasmon Resonance of Cu Nanostructures

Figure 2B:
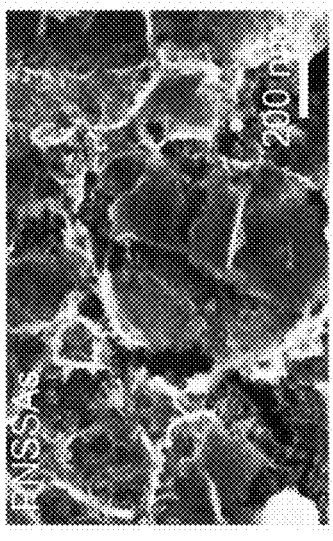
FIGS. 2A-2H show material characterization and surface plasmon resonance simulation. SEM images of the top surface for a 2024 alloy and PNSSAs are shown in FIGS. 2A and 2B, respectively. AFM topographies of the 2024 alloy and PNSSAs, are shown in FIGS. 2C and 2D, respectively, where the units of x-, y-, and z-axis are micrometers.
Figure 2B:
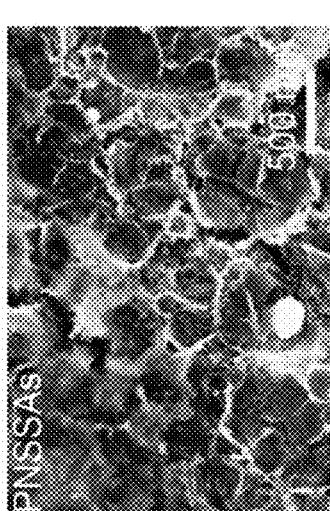
Figure 2A:
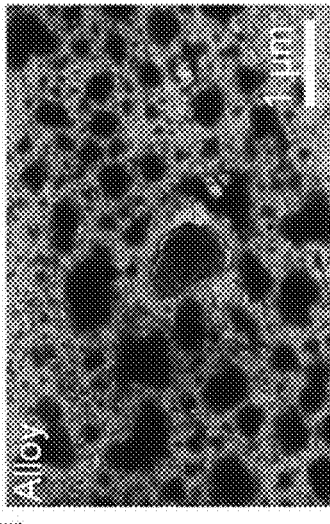
Figures 2C, 2D, 2E:
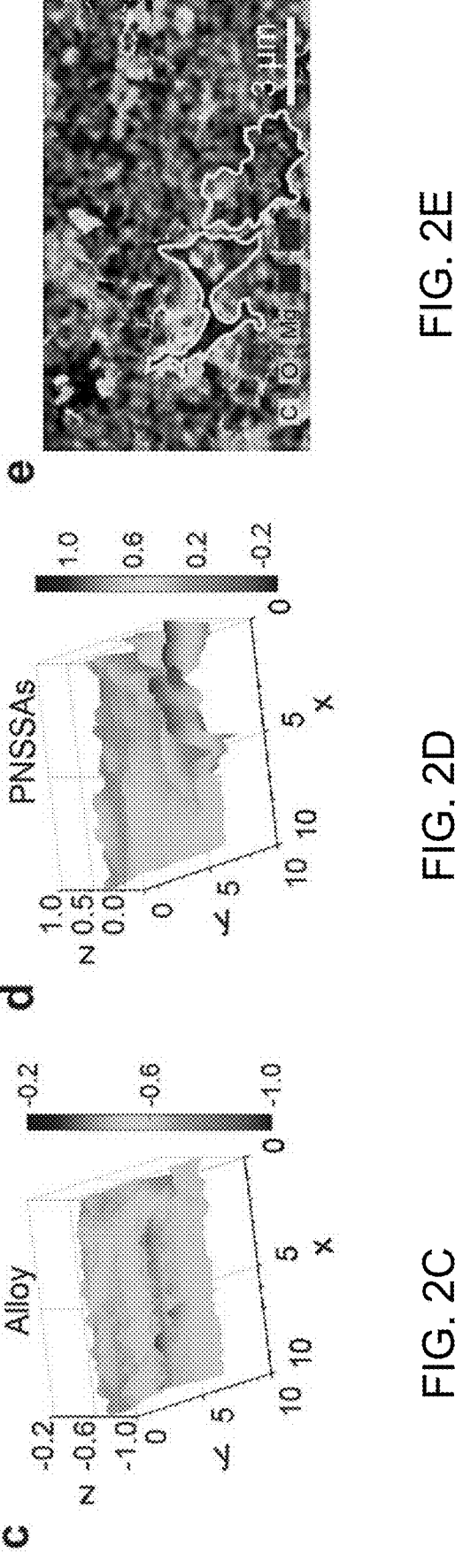
Figures 2F, 2G, 2H:
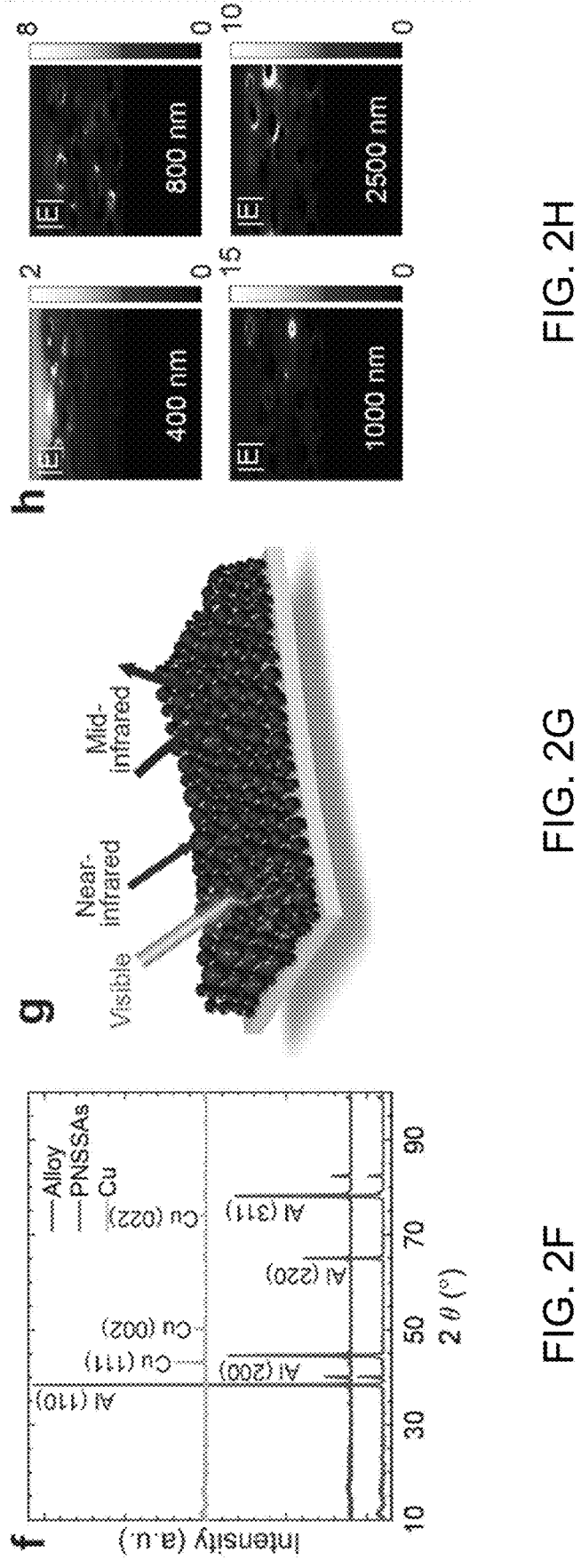

The pristine Al alloy surface is unpolished with small bumps (FIG. 2A), while the surface of PNSSAs is covered by Cu nanostructures which is confirmed by scanning electron micrographs (SEM) (FIG. 2B). The rough surface of PNSSAs is attributed to the removal of Al elements. The remaining Cu keeps the original spatial distribution and forms a shape of 'nanoasperity'. Such shapes contribute to the scattering, trapping, and absorption of sunlight. The surface roughness of Al alloy increases after selective leaching as characterized by the atomic force microscopy (AFM) topographies (FIGS. 2C-2D). This is confirmed by analysis of the AFM data and is indicated by the rising of average surface roughness (Ra) and RMS roughness (Rq). The figure of energy-dispersive X-ray Spectroscopy (EDS) element mapping illustrates that Cu sporadically embellishes on top of the Al alloy (FIG. 2E). The underlying Al element (purple color) appears from the slit of the Cu nanostructure layer as circled by yellow solid curves on the EDS mapping, which is further corroborated by the X-ray diffraction (XRD) spectra (FIG. 2F). For the pristine Al alloy and PNSSAs surface, peaks at 38.46°, 44.67°, 65.13°, and 78.15° are assigned to (110), (200), (220), and (311) lattice planes of Al XRD patterns, respectively, which match with the JCPDS file #040787 [46]. The Cu XRD signal is too weak to be detected due to relative low mass ratio, while the extracted Cu shows three peaks of 43.34°, 50.23°, and 73.90°, which are ascribed to the (111), (220) and (200) facets of Cu, respectively [47].

Figure 3B:
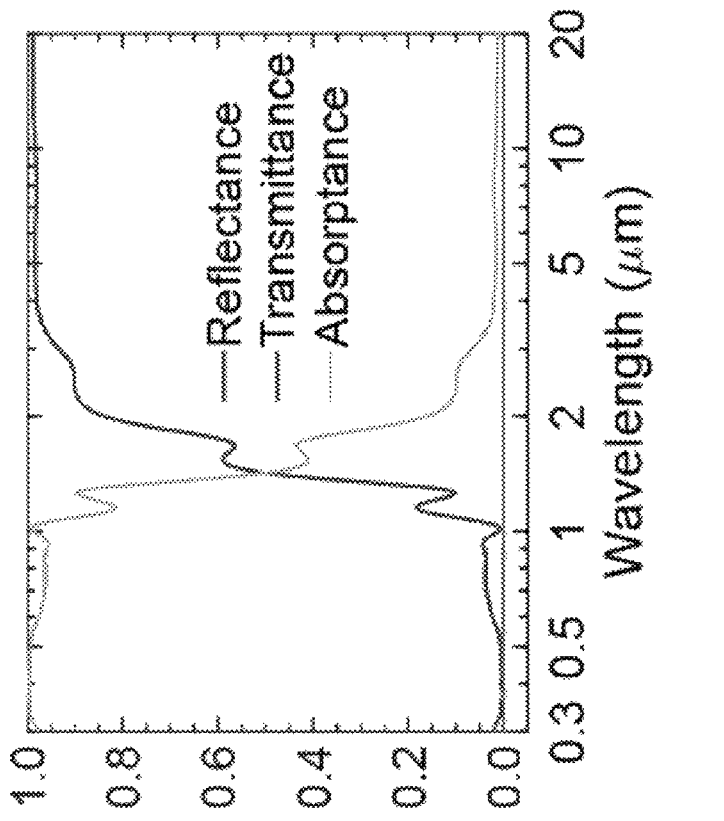
FIGS. 3A-3L show tunable selective solar absorption performances.
Figure 3A:
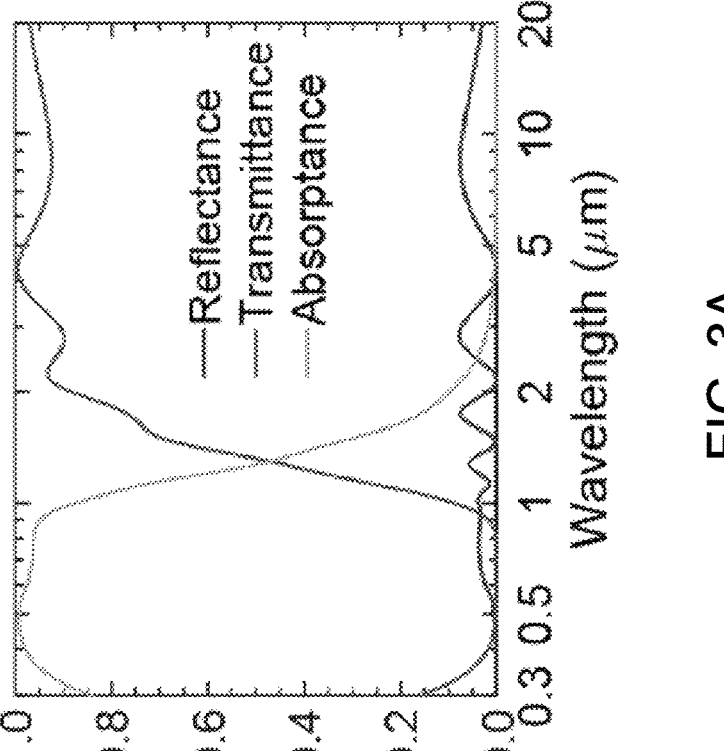

The bulk metal films, such as Cu, Al, and Mg, show high reflectance over the solar and mid-IR wavelengths (0.3-20 μm) (FIG. 1E) because of their high refractive index (n) and extinction coefficient (k). Even thin films as thin as 400 nm on top of bulk Al film show the same high reflective properties as the bulk film. However, they exhibit high absorptance over the solar wavelengths when these metals are in the form of nanoparticles deposited on top of bulk Al films. To simplify the calculation, we consider top nanostructures of the Cu lossy layer as randomly stacked nanoparticle layer. This is attributed to the localized surface plasmon resonance when the dimension of metal nanoparticles is far below the incident wavelengths, i.e., electrons of the nanoparticles at the conduction state move all in phase upon excitations by incident lights and polarize the particle surface [48]. Here, we consider the complicated Cu nanostructures as nanoparticles with broad size distributions from 20 to 260 nm. Plasmonic resonance is excited between the incident light (visible and near-IR) and nanoparticles with certain diameters (FIG. 2G). The strong absorption and scattering of metal nanoparticles are enhanced by the near-field effects established by the electrical field inside the nanoparticles and the dipolar field on the outer surface of nanoparticles [33,37,49-51]. The strong, broad-spectrum, and omnidirectional solar absorption of the Cu nanostructure layer is attributed to the resonance from the single nanofeature and enhancement effect from the adjacent nanofeatures. As shown in the finite-difference time-domain (FDTD) electrical field distribution (FIG. 2H), for the short wavelength (400 nm), field enhancement occurs on the topmost nanoparticles with smaller size, while other field enhancement for longer wavelengths (800 and 1000 nm) is concentrated at the bottom and large-size nanoparticles. This illustrates the size effects of the plasmonic resonance and different penetration depths of diverse wavelengths. For even longer wavelengths in the mid-IR range, the top Cu nanostructure layer shows its lossy features and the incident IR light can be reflected by the alloy substrate (FIG. 2G). This phenomenon is further demonstrated by the simulated reflectance, transmittance, and absorptance spectra of the isolated Cu nanoparticles thin film in FIG. 3A. The reflectance of isolated thin film is low for the full spectrum (0.3-20 $\mu$m) due to the diffused feature of Cu nanoparticles. However, the transmittance and absorptance spectra change abruptly around the wavelength of 1.5 $\mu$m. The Cu nanoparticles layer shows low transmittance and high absorptance from 0.3 to 1.5 $\mu$m resulting from the enhanced plasmon resonance. When isolated Cu nanoparticles are back-coated with a 1 $\mu$m thick Al film, the transmittance becomes zero and this structure exhibits spectral selectivity over two different wavelength regions (FIG. 3B).

Tunable Spectral Selectivity of PNSSAs

Figures 3C, 3D:
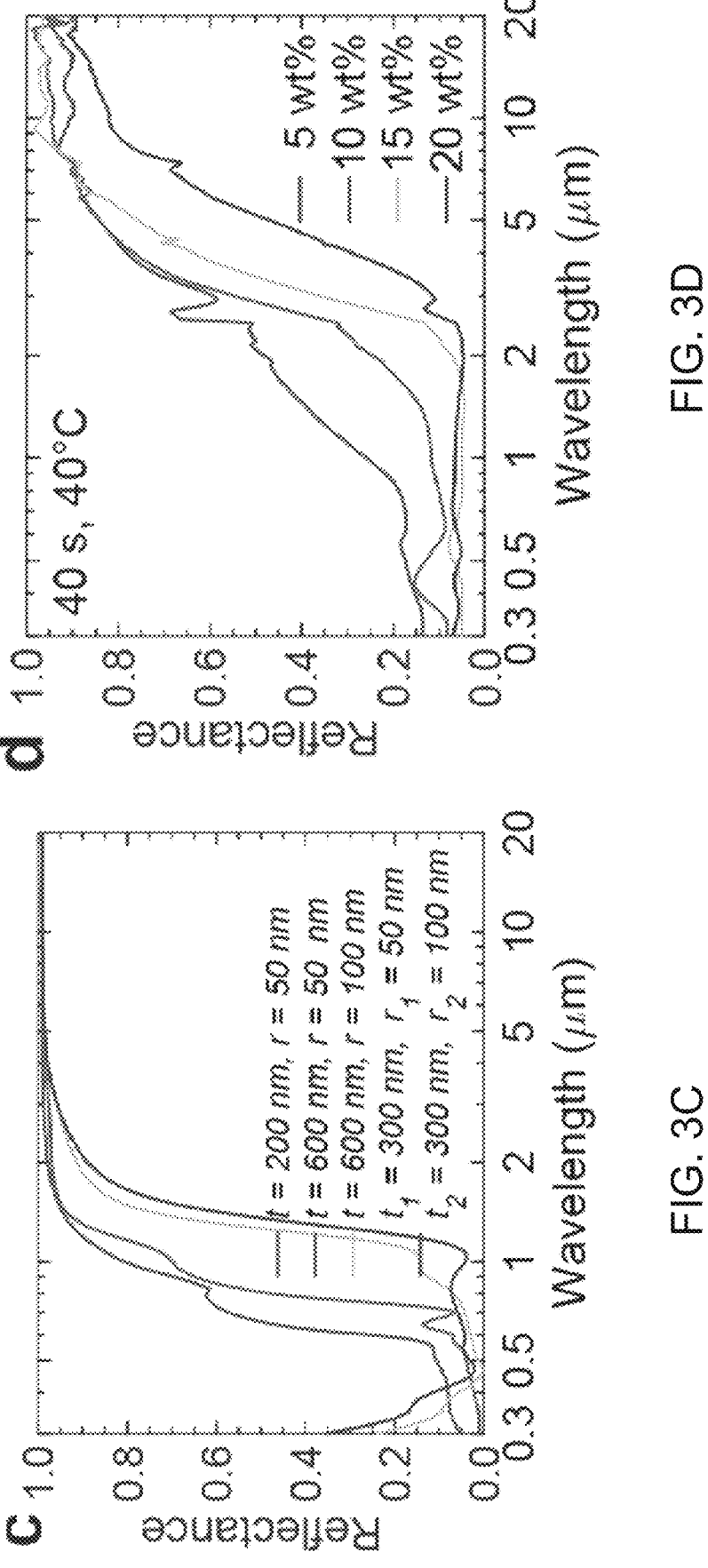

Light absorption of the plasmonic nanostructures relies on various parameters, such as the feature size, thickness, and volume fraction of the absorbing layer. The $\eta_{pho-th}$ is a function of $\alpha$, $\varepsilon$, C F, and Tabs. For different working environments, the most significant parameter is the $\lambda_{cut-off}$, according to the operating temperature and concentration factors. Therefore, it is vital to design PNSSAs that have tunable selective solar absorption performance. First, consider the underlying mechanism of tunable spectral selectivity for PNSSAs. Spectral reflectance of the PNSSAs with different structures is simulated using the FDTD solutions in FIG. 3C. The Al substrate is set to be 1 $\mu$m thick, above which Cu nanoparticles are randomly distributed with different diameters. The diameters, d, and the thickness, t, are varied to simulate the reflectance spectra of diverse structures (FIG. 3C). The wavelength range of high solar absorptance becomes broader with an increased layer thickness of Cu nanoparticles due to the resonance-broadening effect that is ascribed to the electron scattering at the boundary of Cu nanoparticles [37]. The photon interaction thickness increases when t increases and the near-field plasmonic resonance between adjacent nanoparticles is also enhanced to broaden the solar absorption wavelength range. This is illustrated by comparing the reflectance spectra of scenarios for t=200 nm, r=50 nm, and t=600 nm, r=50 nm. For a fixed layer thickness, a broader absorption is observed and extended to the longer near-IR wavelengths when increases (t=600 nm, r=50 nm, and t=600 nm, r=100 nm) because of the higher-order multipolar resonances as well as an increasing particle size. This broadening phenomenon can also be explained by simulating the scattering and absorption efficiency of Cu nanoparticles. The plasmonic resonance wavelengths of absorption and scattering cross-sections shift to longer wavelengths as the Cu nanoparticles size increases. When two layers of 300 nm thick Cu nanoparticles with different diameters of 50 nm and 100 nm are stacked together, the absorption band is broadened again (FIG. 3C).

Figures 3E, 3F:
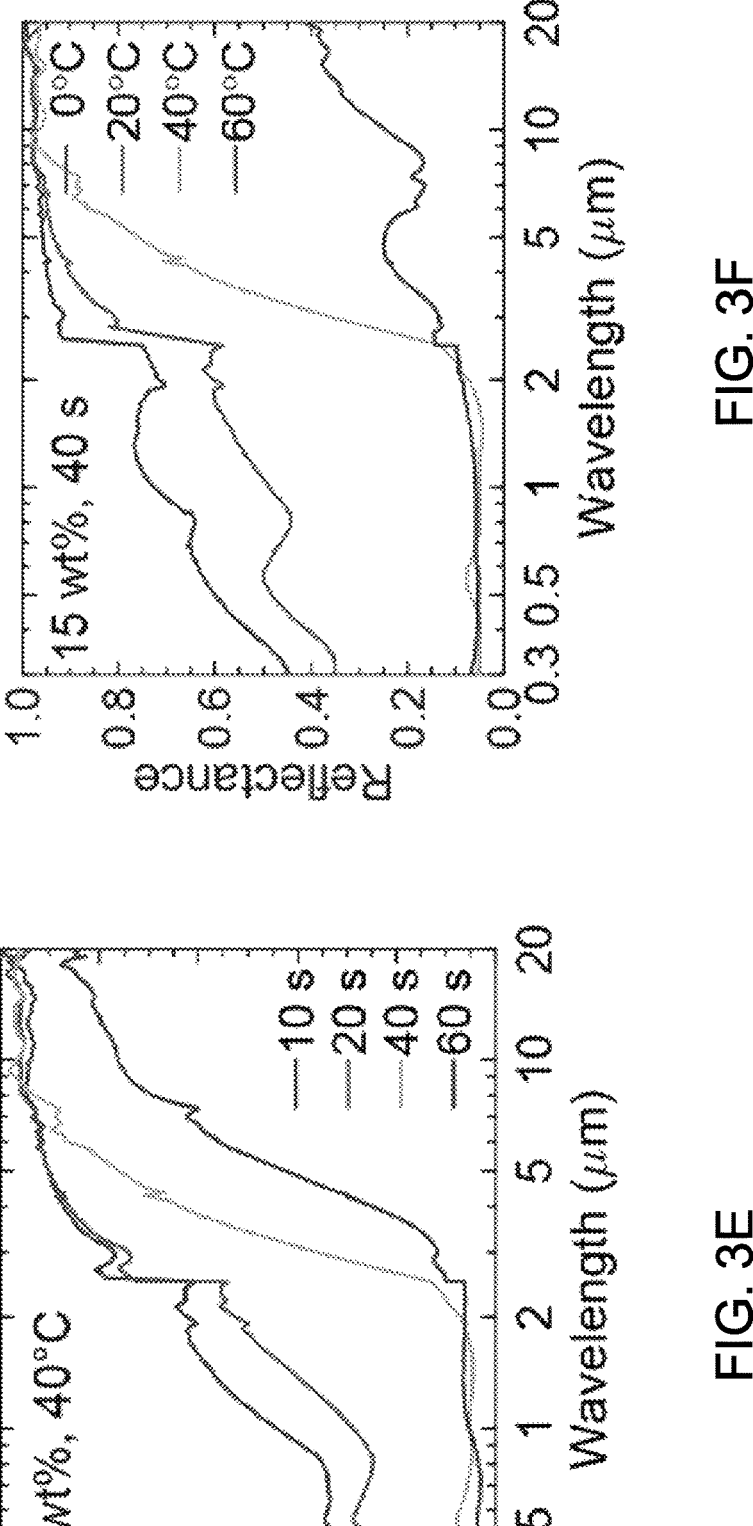
Figure 3H:
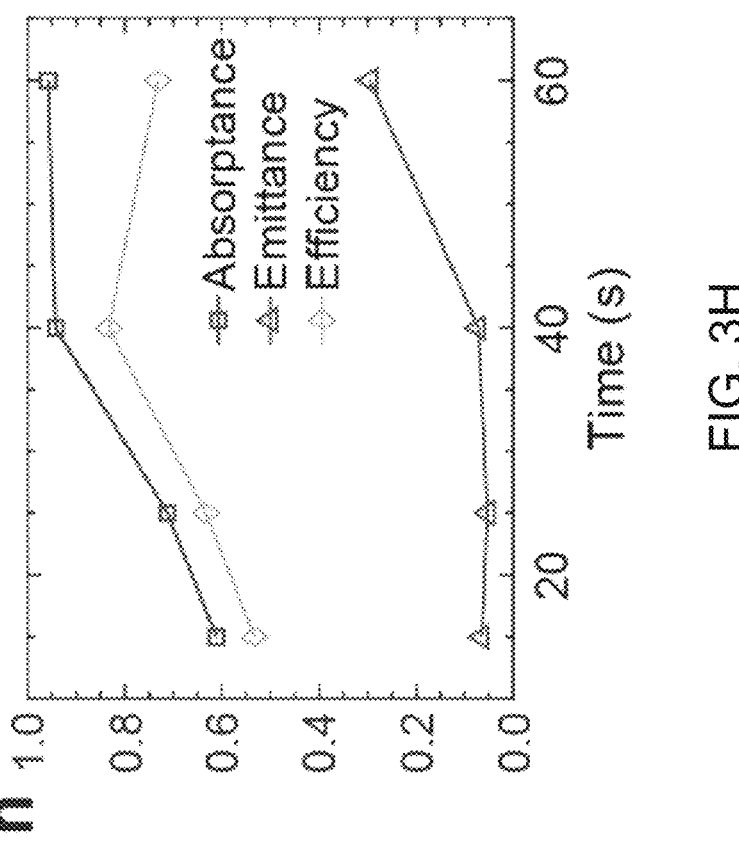
Figure 3G:
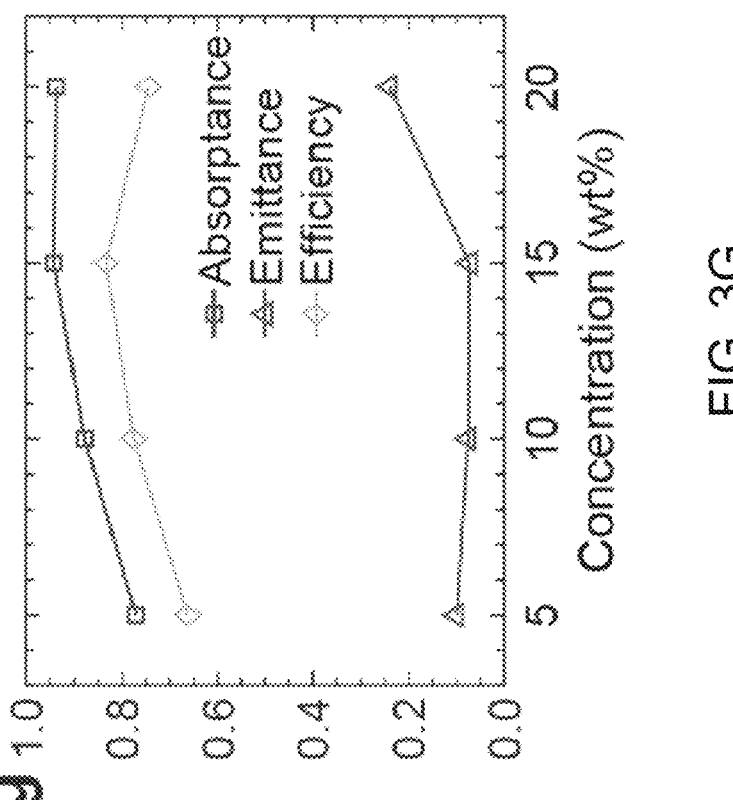
Figure 3J:
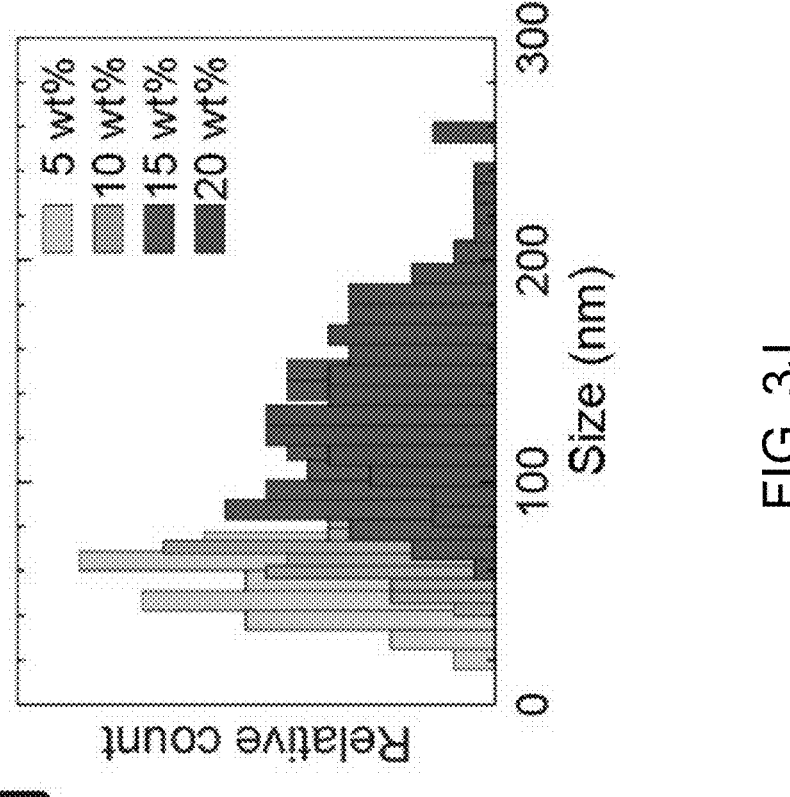
Figure 3I:
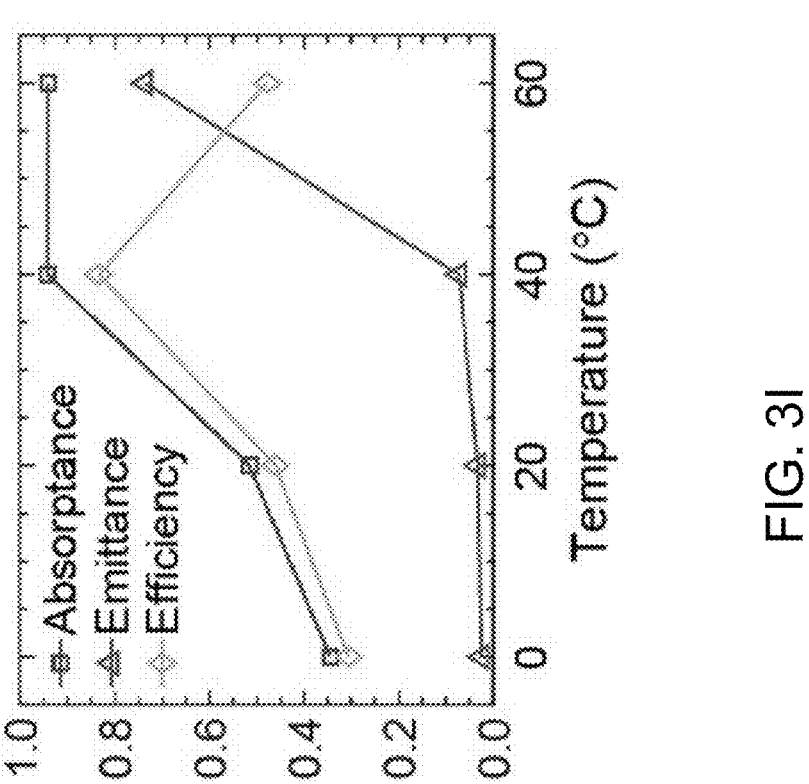
Figure 3L:
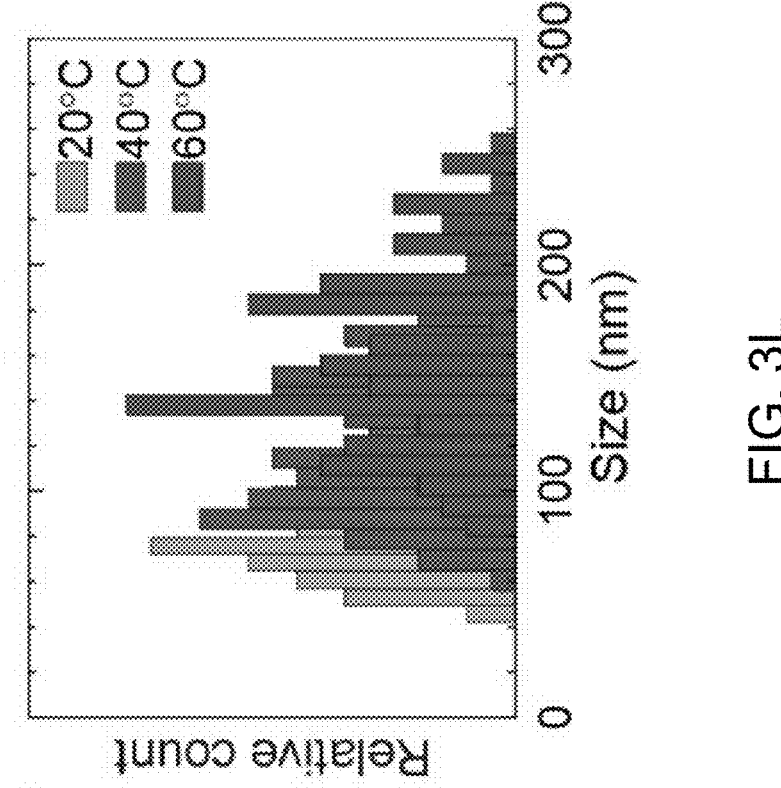
Figure 3K:
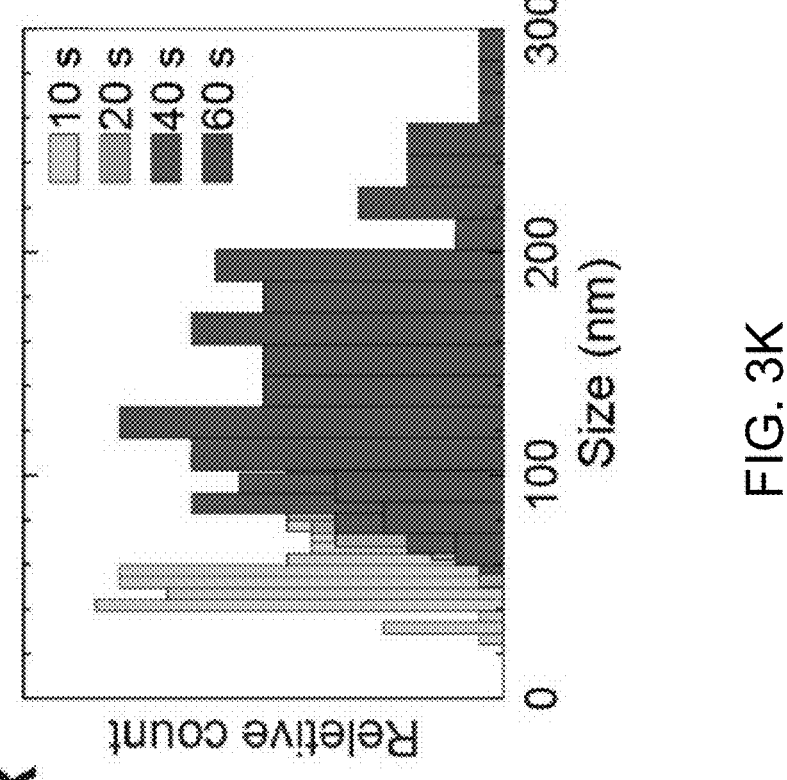

The feature size and thickness of the Cu nanostructure layer can be tuned by controlling the selective leaching reaction parameters, e.g., NaOH (aq) concentrations, reaction times, and temperatures. FIG. 3D-3F show that the reflectance spectra of PNSSAs become lower across the full spectrum from 0.3 to 20 $\mu$m upon increasing NaOH (aq) concentration, reaction time, and reaction temperature. FIG. 3G-3I summarize the overall $\alpha$, $\varepsilon$, and $\eta_{pho-th}$ of PNSSAs. This shows that $\alpha$ increases from 0.77 to 0.95 and $\varepsilon$ increases from 0.07 to 0.24 upon NaOH (aq) gets more concentrated (FIG. 3D, 3G). With lengthened reaction time, $\alpha$ rises from 0.61 to 0.96 and $\varepsilon$ increases from 0.06 to 0.30 (FIG. 3E, 3H). The $\alpha$ increases from 0.34 to 0.95 and $\varepsilon$ increases from 0.03 to 0.74 with the solution temperature rising from 0 to 60° C. (FIG. 3F, 3I). Meanwhile, the $\eta_{pho-th}$ changes as functions of the $\alpha$ and $\varepsilon$. Here, the $T_{abs}$ and $T_{air}$ are fixed to be 100° C. and 20° C., respectively. The PNSSAs are under 1 sun irradiance, meaning has a value of 1. Variations of $\alpha$, $\varepsilon$, and $\eta_{pho-th}$ are attributed to the d and t of the Cu nanostructure layer. FIGS. 3J-I illustrate the scaled distributions of by analyzing the SEM morphologies of PNSSAs obtained at different selective leaching reaction parameters. Both the average size and standard deviation of the Cu nanostructures increase corresponding with the increase of NaOH (aq) concentrations (FIG. 3J-3L). The broad size distribution of Cu nanofeatures contribute to the broadening of solar absorption wavelength band (FIG. 3J) whose underlying mechanism has been discussed and validated in other literature [37,50]. Similar trends are also observed for increasing reaction times and solution temperatures (FIG. 3K-3L). The increasing of nanofeature sizes explains the broadening of the solar absorption band, but the increase of may not be due to the presence of large nanofeature sizes. The largest nanofeature size is still below 300 nm which is much smaller than the mid-IR wavelengths (2.5-20 $\mu$m), rendering plasmonic resonances ineffective. The reason that increases with higher NaOH (aq) concentrations, longer reaction time, and higher solution temperatures are likely due to the thickness of the Cu nanostructures layer. According to the numerically simulated spectra of FIG. 3C, thicker Cu nanostructure layers lead to an increase of $\varepsilon$. From SEM images, it is evident that the coverage of the Cu nanostructures is enhanced upon increasing NaOH (aq) concentration, reaction temperature, and reaction time.

Thermal and Mechanical Stability Tests of PNSSAs

Figures 4A, 4B, 4C:
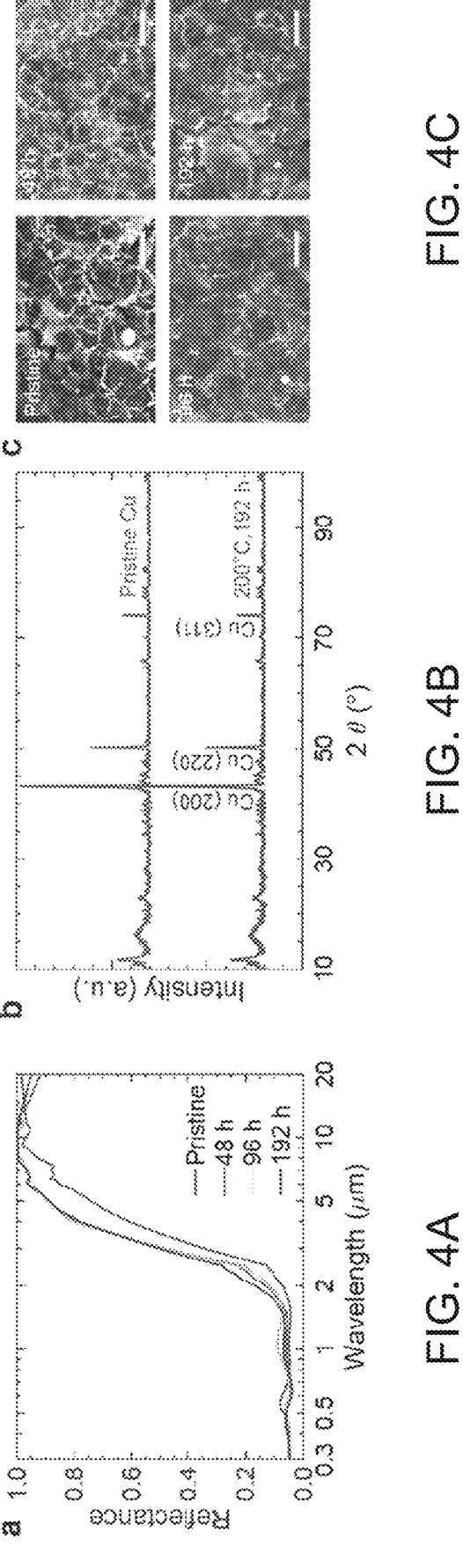
FIGS. 4A-4F show thermal and mechanical stability tests of spectral selectivity.

The performance of thermal and mechanical stability for PNSSAs within practical conditions is crucial for industrial applications. Thermal stability tests of PNSSAs in an argon environment are conducted for 192 h at 200° C. FIG. 4A displays the spectral reflectance of PNSSAs after long-time thermal stability tests. Table 1 presents the corresponding overall $\alpha$, $\varepsilon$, and $\eta_{pho-th}$. For example, after 192 h of thermal annealing in argon at 200° C., the $\alpha$ decreases slightly from 0.942 to 0.937, and the $\varepsilon$ also decreases from 0.078 to 0.029. The $\eta_{pho-th}$ even increases from 83.4% to 85.4% due to reduced heat loss from the decreasing $\varepsilon$.

Overall, the performance of PNSSAs after long-term thermal stability tests is stabilized within 192 h and is slightly improved due to the reduced $\alpha$. XRD spectra of the extracted pristine Cu nanostructures before and after 192 h thermal tests are identical with the pure Cu XRD peaks, indicating that Cu nanostructures layer and Al alloy substrate have not been oxidized (FIG. 4B). SEM images demonstrate that the surface morphology of PNSSAs remains intact after annealing at 200° C. (FIG. 4C). Cu nanostructures begin to coalescence after 48 h thermal annealing as shown in FIG. 4C. Meanwhile, the reduces from 0.078 to 0.034. This may be due to the coalescence of Cu nanostructures which reduce the layer thickness of the Cu nanostructures. This is consistent with the prediction of the numerical simulation (FIG. 3C). To further validate the surface morphology consistency during extended annealing, surface topology is mapped by AFM. The root mean square roughness (Rq) of PNSSAs after annealing fluctuates between 0.13 and 0.27 μm, suggesting the surface morphology thermal stability. The $\varepsilon$ of PNSSAs is 0.029 after 192 h thermal annealing, accompanied by a high stable high $\alpha$ of 0.94, which offers a high spectral selectivity $\alpha/\varepsilon$ of 32.4. For an even harsher environment or higher operating temperature, the stability can be further improved by depositing anti-oxidation coatings, such as $SiO_2$ and $Al_2O_3$. For mid- to high-temperature solar power systems, SSAs operate under vacuum-tube to suppress heat loss due to conduction and convection, which also eliminates the need of anti-oxidation coatings.

Figures 4D, 4E, 4F:
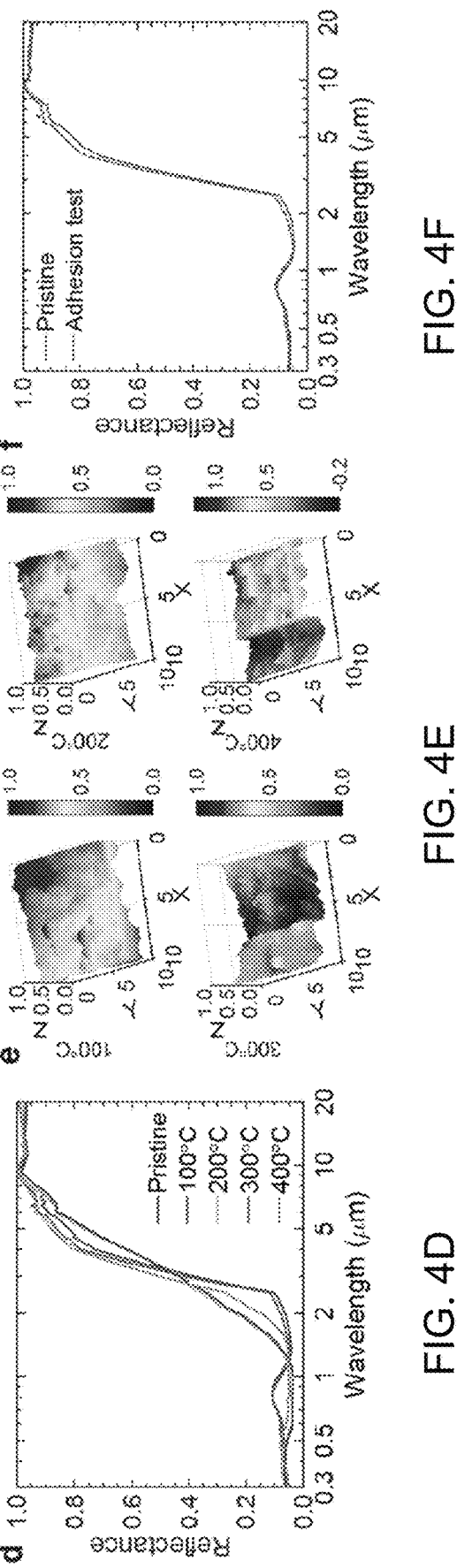

Another advantage of SSAs for industrial utilization is thermal insensitivity at elevated temperatures. Emergencies may occur during the practical operation, such as the shutdown of working fluid to cool SSAs, causing immediate overheating. Therefore, it is essential to test the thermal insensitivity of PNSSAs at temperatures higher than the optimal operating conditions. As such, 2 h annealing tests at 100, 200, 300, and 400° C. are performed to evaluate the thermal insensitivity of PNSSAs. The $\alpha$ remains almost unchanged during the tests at elevated temperatures and the $\varepsilon$ fluctuates between 0.038 and 0.053, indicating a superior thermal insensitivity of spectral selectivity (FIG. 4D). AFM topographies in FIG. 4E do not reveal any abrupt changes in surface morphologies. RMS roughness of the PNSSAs is temperature-independent and lies within 0.13 and 0.16 μm. The Cu nanostructures start to coalesce after annealing. Enhancement effect on the spectral selectivity is observed upon annealing at diverse temperatures (pristine: $\alpha/\varepsilon$=12.1, 100° C.: $\alpha/\varepsilon$=21.6, 200° C.: $\alpha/\varepsilon$=15.1, 300° C.: $\alpha/\varepsilon$=17.8, and 400° C.: $\alpha/\varepsilon$=24.6, Table 1). The XRD spectra verify that no oxidation occurs during the annealing process. The PNSSAs can be directly employed to the solar thermal application of flat plate collectors since there is no obvious change in spectral selectivity. The anti-oxidation coating such as $SiO_2$, $Al_2O_3$, and $HfO_2$ can be another option to enhance its thermal stability at high temperatures.

Mechanical stability is another criterion for retaining optical and thermal performance in real-life applications. No visual changes are observed after adhesion tests, demonstrating that the adhesion between the Cu nanostructures and the Al alloy is enough to keep the original reflectance spectra (FIG. 4F). There are no significant changes of $\alpha$, $\varepsilon$ and $\eta_{pho-th}$ (Table 1—FIG. 6). This mechanical stability makes the PNSSAs compatible with industrial manufacturing processes, such as cutting to various dimensions and rolling into selective absorbing tubes.

Photothermal Performance of PNSSAs

Figures 5A, 5B, 5C:
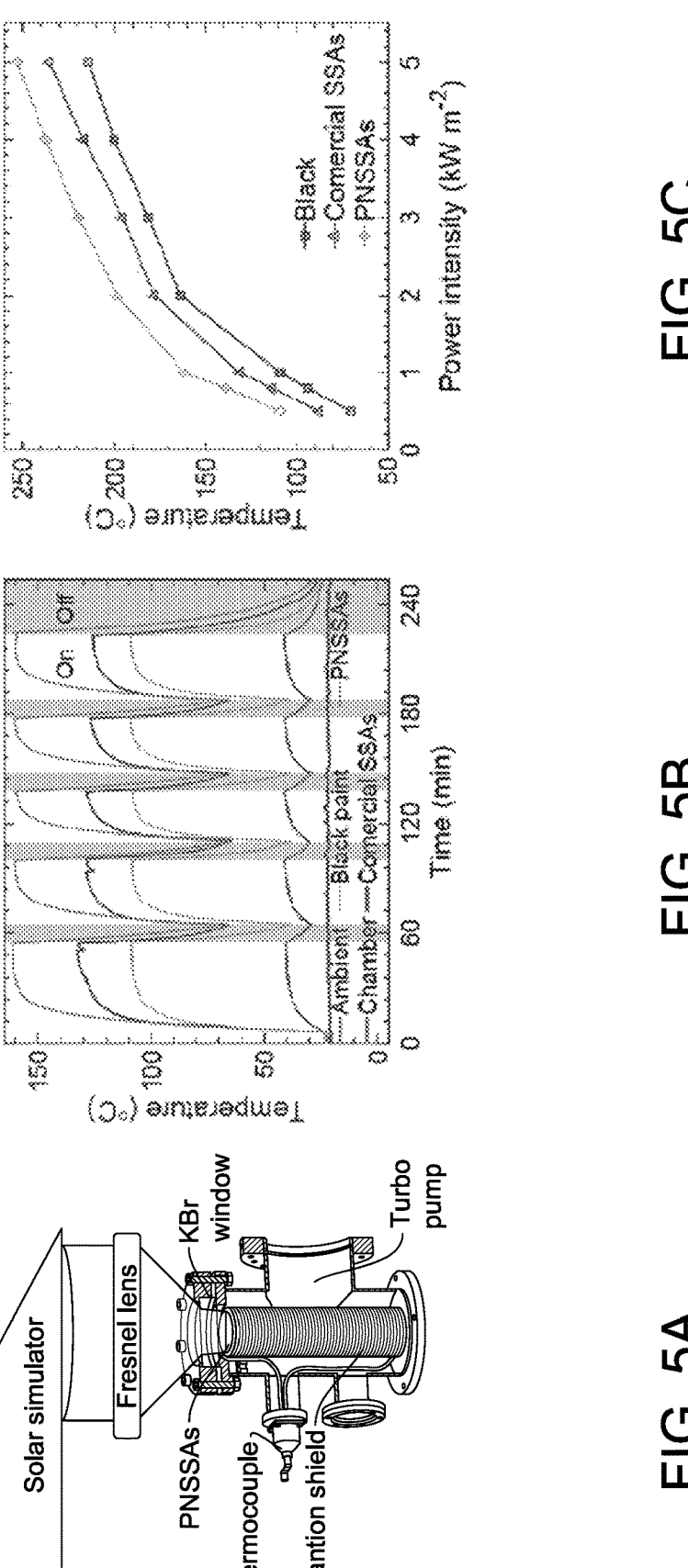
FIGS. 5A-5F show indoor photothermal performance.

To evaluate the performance of PNSSAs in solar harvesting, photothermal temperature measurements are conducted under 1 sun (1000 W m$^{-2}$) in a vacuum chamber at room temperature (21° C.) (FIG. 5A). A black non-selective absorber ($\alpha/\varepsilon$=0.965/0.977) and a commercial SSA ($\alpha/\varepsilon$=0.9765/0.79) are selected as control groups to demonstrate the advantages of PNSSAs, and their respective reflectance spectra. The potassium bromide (KBr) window has high transmittance over the relevant wavelength region (0.3-20 μm) and does not block the thermal reemission of heated samples. The steady-state temperature of PNSSAs is 162° C. under 1 sun illumination (FIG. 5B) while the stable temperatures of the commercial SSAs and black absorber are 133 and 109° C., respectively. The much higher stable temperature of PNSSAs is attributed solely to the spectral selectivity since the solar intensity, conductive, and convective conditions in all measurements are identical. The stable temperature under 1 sun of PNSSAs exceeds those of other photothermal absorbers reported in recent literature [33,37, 52]. Upon 5 illumination cycles, the highest temperature of PNSSAs remains constant, demonstrating its stability under sunlight (FIG. 5B).

Even higher operating temperatures are desired for concentrated solar power systems. The same experimental apparatus equipped with a Fresnel lens is employed to evaluate the photothermal performance under various solar intensities (2, 3, 4, and 5 kW m-2). Steady-state temperatures of 198° C. at 2 suns, 220° C. at 3 suns, 237° C. at 4 suns, and 253° C. at 5 suns are achieved, indicating its potential applications for mid-temperature solar thermal systems (FIG. 5C). It is 20° C. and 35° C. higher than that of the commercial SSAs and black absorbers, respectively. Furthermore, because the sunlight varies day-to-day and at different locations on the Earth, it is significant to achieve a high temperature under weak sunlight (<1 kW m$^{-2}$, FIG. 5C). The PNSSAs, commercial SSAs, and black absorbers reach steady-state temperatures of 138, 113, and 94° C. under 0.8 kW m-2, respectively. The stagnation temperature of 138° C. at 0.8 suns is high enough for sterilization applications (>121° C.) [53,54], thus extending the operating time of solar sterilization since the solar intensity is above 0.8 kW m$^{-2}$ for almost half of the daytime [53]. When the solar intensity drops to 0.5 kW m$^{-2}$, the stable temperature of PNSSAs is 109° C., high enough to benefit various applications, such as industrial heating [55], seawater steam generation [19], and ice mitigation [56].

Figures 5D, 5E, 5F:
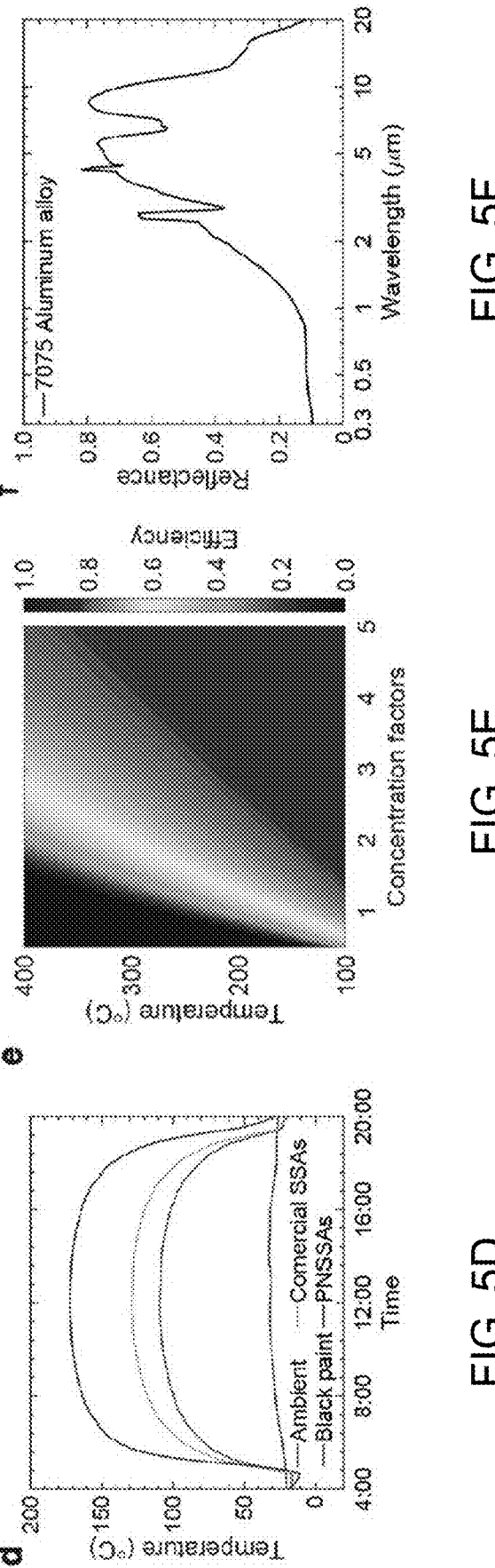

The transient temperature response of PNSSAs is simulated by analyzing a heat transfer model. The solar intensities and ambient temperature in Boston on Jun. 20, 2020, were chosen as input data [57]. The highest temperature of 173° C. is reached compared with that under 1 sun solar simulator (162° C.). During the daytime, the stable temperature is above 150° C. for roughly 11 h (FIG. 5D). Such temperature is suitable to enhance space heating and seawater desalination. FIG. 5E shows the $\eta_{pho-th}$ of PNSSAs are functions of operating temperatures and concentration factors. The reflectance spectra of PNSSAs at room temperatures are considered within calculation of the $\eta_{pho-th}$ since its spectral selectivity remains or even becomes better at elevated annealing temperatures (FIG. 4A, 4D). It is evident that $\eta_{pho-th}$ increases with the rising of when its operating temperature are fixed ($\eta_{pho-th}$=74% under 1 sun for 100° C., $\eta_{pho-th}$=86% under 3 suns for 100° C., and $\eta_{pho-th}$=88% under 5 suns for 100° C.). This is attributed to the increase of according to Eq. (1). However, due to the heat loss from the blue-shift of the blackbody thermal radiation spectrum, $\eta_{pho-th}$ diminishes when the operating temperature increases at a fixed solar intensity (FIG. 5E). The fabrication cost of laboratory-scale PNSSAs is roughly 0.735 USD m$^{-2}$ including both the material and electricity costs, which will surely be further reduced significantly in industrial-scale manufacturing. This highlights that our proposed selective-leaching-alloy approach towards spectral selectivity for solar harvesting is both highly efficient for a temperature range from 100 to 400° C. as well as extremely cost-effective.

The selective-leaching-alloy technique is demonstrated above to fabricate plasmonic resonance SSAs with high $\eta_{pho-th}$ and thermal stability. Selective leaching phenomenon is a type of corrosion occurring in some metal alloys that inert metal is removed from the alloy. This technique has been employed to produce metallic materials with high surface area [58] and porous battery anodes [59], while the literature rarely reports on the production of SSAs using commercially available Al alloy through selective leaching. We also demonstrate that a similar spectral selectivity is achieved by using other Al alloys, such as 7075, and following the aforementioned recipe (FIG. 5F). This strategy can be used to leach minor elements in stainless steels and superalloys to fabricate SSAs for higher-temperature solar thermal systems as these materials have high melting and oxidation temperatures.

In summary, we have developed a new scalable strategy based on a solution-processed selective leaching reaction for cost-effective and feasible fabrication of SSAs. The obtained plasmonic Cu-rich nanostructures with broadband solar absorption and mid-IR lossy feature are uniformly assembled on the alloy infrared reflectors, which are prepared by selectively dissolving the surface layer of Al alloys in a hot alkaline solution. Excitation of surface plasmon resonance of Cu nanostructures with a broad feature size distribution enhanced by the multiple reflection and absorption occurring within the nanoporous Cu structures yields efficient omnidirectional solar absorptance (0.94 at 0°, 0.95 at 36°, and 0.96 at 60°). The resulting dual-layer PNSSAs consisting of lossy Cu nanostructures on an alloyed infrared mirror lead to low thermal emittance (0.08 for pristine and 0.03 for 200° C. thermal annealing) without any anti-reflection coating. By optimizing the concentration of the alkaline solution, chemical reaction time, and temperature, tunable spectral selectivity can be obtained to suit a range of working temperatures. The PNSSAs are thermally stable (200° C. for 192 h) and insensitive to varying operating temperatures (100-400° C.). Overall, our selective leaching strategy leads to simultaneous high and angle-independent solar absorption, low hemispherical thermal emittance, flexible tunability of spectral selectivity, and thermomechanical stability. This strategy can also be applied to other alloys with electrochemical selective etching, such as stainless steels and superalloys, for mid-(300-600° C.) to high-temperature (>600° C.) solar thermal applications. Last but not the least, this strategy is cost-effective, using widely available materials and chemical and inexpensive solution processing at a lab cost of about 0.735 USD m-2. Thus, we have provided an appealing approach for fabricating SSAs with larger versatility and scalability since they can be synthesized onto diverse substrates of alloys over large areas.

EXPERIMENTAL INFORMATION

Fabrication of PNSSAs, Black Absorber, and Commercial SSAs

2024 Al alloy sheets (thickness— 300 μm, standard— ASTM B209, McMASTER-CARR) were cut into small strips (70 mm×30 mm). Before selective leaching in NaOH (aq), these strips were sonicated cleaning in acetone (99.5%, Sigma-Aldrich) for 15 min, followed by rinsing with isopropyl alcohol (99.5%, Sigma-Aldrich) for 1 min and blow-drying with argon for 30 s. The clean alloy strips were immersed into a NaOH (aq) with various concentrations (5, 10, 15, and 20 wt %), at different temperatures (0, 20, 40, and 60° C.) or for different times (5, 20, 40, and 60 s) to form the nanostructures. The prepared PNSSAs were immersed immediately into deionized water to extinguish the chemical reaction and then blow-dried with argon. Similar procedures were conducted with 7075 Al alloy sheets to achieve spectrally selective PNSSAs (Section 5, supporting information). Large-size PNSSAs were fabricated using a 25 cm by 25 cm 2024 alloy sheet with a proportional mass of NaOH (aq) at the same procedure of fabricating small PNSSAs. The black absorber was prepared by spraying the gloss black paint (Rust-Oleum, 7778830) on the surface of the 2024 alloy at a distance of 20 cm, and a uniform paint layer with a thickness of about 20 μm was deposited. Commercial SSAs were fabricated through spraying selective solar coating (Thurmalox, 013-250) on the 2024 alloy to form a 30 μm thick coating. Both the black absorber and commercial SSAs are baked in a 100° C. oven for 30 min to remove the solvents.

Materials Characterizations

The surface morphologies of the PNSSAs were characterized by SEM (Zeiss Supra 25) with an acceleration voltage of 10 kV equipped with energy-dispersive X-ray Spectroscopy. The sizes of Cu nanostructure features were measured by ImageJ. The topographies were imaged by an AFM (Agilent 5500) with a silicon tip (CONTV-A) at a step size of 0.4 inch/s in the contact mode. The average and RMS roughness were collected for the pristine PNSSAs samples and samples after thermal stability tests. The phase identifications of the Cu nanostructure and alloy were conducted with an XRD (Broker D8) scanning from 15 to 100° with a stepsize of 0.02°.

Optical Characterizations

The UV-visible-near-IR (0.3-2.5 μm) hemispherical reflectance (R) spectra of absorbers were characterized by a spectrophotometer (Jasco V770) equipped with a BaSO4 integrating sphere (Jasco ISN-923) at an incident angle of 6°. The mid-IR (2.5-20 μm) hemispherical reflectance spectra were characterized using a Fourier transform infrared spectrometer (FTIR, Jasco 6600) with a diffused gold integrating sphere. The absorptance ($\acute{\alpha}$) equals 1−R, since the transmittance (T) was zero due to the opaqueness of the PNSSAs at a thickness of 300 μm. The absorptance is equal to emittance ($\acute{\epsilon}$) when an object is in thermodynamic equilibrium according to Kirchhoff's law of thermal radiation. Hemispherical reflectance spectra of PNSSAs sample for different AOIs were characterized by using home-built wedge blocks following the measurement methods in our recent work [28].

Calculation of the overall solar absorptance, thermal emittance, and photothermal conversion efficiency The overall solar absorptance, $\acute{\alpha}$, is functions of wavelengths and incidents angles, which is defined as [60]:

$$\acute{\alpha}(\lambda, \theta, \phi) = \frac{\int_{0.3\mu m}^{2.5\mu m} I_{sun}(\lambda, \theta, \phi)[1 - R(\lambda, \theta, \phi)]d\lambda}{\int_{0.3\mu m}^{2.5\mu m} I_{sun}(\lambda, \theta, \phi)d\lambda} \quad (2)$$

where $\lambda$ is the wavelength of solar radiation, $\phi$ is the azimuthal angle, and $\theta$ is the polar angle. $\acute{\alpha}(\lambda, \theta, \phi)$ and R $(\lambda, \theta, \phi)$ are the spectral directional absorptance and reflectance. $I_{sun}$ is the incident solar intensity at AM 1.5 [61] which is confined from 0.3 to 4.0 μm. Here, the integration interval is limited from 0.3 to 2.5 μm which covers 99.2% power intensity of the solar radiation.

The overall thermal emittance, $\acute{\epsilon}$, is also dependent on the wave-lengths and incident angles, which is derived from [60]:

$$\acute{\epsilon}(\lambda, \theta, \phi) = \frac{\int_{2.5\mu m}^{20\mu m} I_{bb}(\lambda, \theta, \phi)[1 - R(\lambda, \theta, \phi)]d\lambda}{\int_{2.5\mu m}^{20\mu m} I_{bb}(\lambda, \theta, \phi)d\lambda} \quad (3)$$

13

14 where $I_{bb}(\lambda, \theta, \phi)$ is the blackbody radiation intensity given by Planck's law. $\varepsilon(\lambda, \theta, \phi)$ is the spectral directional absorptance at a certain operating temperature. It should be noted that the overall thermal emittance is calculated using the spectra at room temperature according to the 100° C. blackbody, which is mostly used in other articles for comparison.

Thermal Stability Tests

Thermal stability tests were performed in an alumina tube furnace under an argon environment. The samples were placed in an alumina crucible boat (100 mm×30 mm×20 mm) in the center of the alumina tube. The alumina tube connected to a rotary vane vacuum pump was first evacuated to a vacuum atmosphere (1.0 Pa). Then the argon gas valve was opened and swept through the alumina tube for 30 s before the argon gas valve was closed. This process was repeated three times to remove the air inside the alumina tube. Then, samples were annealed at various temperatures (100, 200, 300, and 400° C.) at a temperature rising rate of 10° C. min$^{-1}$. A heating period of 48 h was conducted to validate the long-time thermal stability and the samples were taken out to measure their reflectance spectra after 48 h. Thermal annealing cycles (48 h×4 cycles) are repeated at 200° C. at the argon environment.

Mechanical Stability Characterizations

The mechanical stability tests were performed by following the ASTM (D3359-09) adhesion test standard. The scotch tape was pressed on the surface of the PNSSAs and removed quickly along the direction of the alloy strips. Reflectance spectra were measured before and after adhesion tests to validate their mechanical tests.

Indoor Solar Simulator Tests

Indoor photothermal measurements were carried out in a vacuum chamber with a diameter of 10 cm which was equipped with a KBr window. This vacuum of this chamber was pump down to be around $5\times10^{-3}$ Pa by connecting to a turbomolecular pump with a pumping speed of 1000 ls/s (N$_2$). The ultra-low vacuum eliminated the convective and conductive heat transfer from the air. The samples of the black absorber, commercial SSAs, and PNSSAs were placed on ceramic fiberboard with a thickness of 5 mm and thermal conductivity of 0.074 W m$^{-1}$ K$^{-1}$. The area ratio between the absorbers and the ceramic fiberboard was kept fixed to be 10 to depreciate the downward thermal loss. A solar simulator (Newport 94081 A, Class ABB) was adjusted to simulate the standard AM 1.5 Global solar spectrum with a stable solar intensity of 1 kW m$^{-2}$. K-type thermocouples were attached to the backside of absorber samples to record their steady-state temperatures through the data acquisition device (NI PXI 6289, National Instrument). The temperature recording rate was set at a frequency of 2 Hz and the solar intensity output was calibrated by a solar power meter (TES 132) to ensure continuity between each experiment.

Numerical Simulations

FDTD solutions (ANSYS Lumercial 2020) were performed to simulate the reflectance and transmittance spectra. A plane wave with a plane wavelength range from 0.3 to 20 μm was used as the light source. Randomly distributed Cu nanoparticles with sizes ranging from 20 nm to 140 nm were generated to simulate the Cu nanostructures on top of the 2024 alloy. The boundary layer of the-direction was set to be perfectly matched layers, while the boundary conditions along-and-directions were defined as periodic boundaries. Complex refractive indices of Cu, Mg, Mn, and Al were extracted from Palik's book [62].

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

REFERENCES

[1] W. A. Braff, J. M. Mueller, J. E. Trancik, Value of storage technologies for wind and solar energy, Nature Clim. Change 6 (10) (2016) 964-969.

[2] F. Creutzig, P. Agoston, J. C. Goldschmidt, G. Luderer, G. Nemet, R. C. Pietzcker, The underestimated potential of solar energy to mitigate climate change, Nat. Energy 2(9) (2017) 1-9.

[3] A. B. Munir, F. Muhammad-Sukki, N. A. Bani, Solar energy needs focus, Nature 529 (7587) (2016).

[4] Y. Deng, X. Zheng, Y. Bai, Q. Wang, J. Zhao, J. Huang, Surfactant-controlled ink drying enables high-speed deposition of perovskite films for efficient photovoltaic modules, Nat. Energy 3 (7) (2018) 560-566.

[5] W. Li, J. Zheng, B. Hu, H.-C. Fu, M. Hu, A. Veyssal, Y. Zhao, J.-H. He, T. L. Liu, A. Ho-Baillie, et al., High-performance solar flow battery powered by a perovskite/silicon tandem solar cell, Nature Mater. 19 (12) (2020) 1326-1331.

[6] T. P. Yoon, M. A. Ischay, J. Du, Visible light photocatalysis as a greener approach to photochemical synthesis, Nature Chem. 2 (7) (2010) 527-532.

[7] A. Boretti, J. Nayfeh, A. Al-Maaitah, Hydrogen production by solar thermochem-ical water-splitting cycle via a beam down concentrator, Front. Energy Res. 9 (2021) 116.

[8] D. Kraemer, Q. Jie, K. McEnaney, F. Cao, W. Liu, L. A. Weinstein, J. Loomis, Z. Ren, G. Chen, Concentrating solar thermoelectric generators with a peak efficiency of 7.4%, Nat. Energy 1 (11) (2016) 16153.

[9] A. Fiorino, L. Zhu, D. Thompson, R. Mittapally, P. Reddy, E. Meyhofer, Nanogap near-field thermophotovoltaics, Nature Nanotechnol. 13 (9) (2018) 806-811.

[10] D. Fan, T. Burger, S. McSherry, B. Lee, A. Lenert, S. R. Forrest, Near-perfect photon utilization in an air-bridge thermophotovoltaic cell, Nature 586 (7828) (2020) 237-241.

[11] H. Ghasemi, G. Ni, A. M. Marconnet, J. Loomis, S. Yerci, N. Miljkovic, G. Chen, Solar steam generation by heat localization, Nature Commun. 5 (1) (2014) 1-7.

[12] M. Mansø, A. U. Petersen, Z. Wang, P. Erhart, M. B. Nielsen, K. Moth-Poulsen, Molecular solar thermal energy storage in photoswitch oligomers increases energy densities and storage times, Nature Commun. 9 (1) (2018) 1-7.

[13] K.-T. Lin, H. Lin, T. Yang, B. Jia, Structured graphene metamaterial selective absorbers for high efficiency and omnidirectional solar thermal energy conversion, Nature Commun. 11 (1) (2020) 1-10.

[14] Z. Wang, Z. Tong, Q. Ye, H. Hu, X. Nie, C. Yan, W. Shang, C. Song, J. Wu, J. Wang, et al., Dynamic tuning of optical absorbers for accelerated solar-thermal energy storage, Nature Commun. 8 (1) (2017) 1-9.

[15] S. A. Jalil, B. Lai, M. ElKabbash, J. Zhang, E. M. Garcell, S. Singh, C. Guo, Spectral absorption control of femtosecond laser-treated metals and application in solar-thermal devices, Light: Sci. Appl. 9 (1) (2020) 1-9.

[16] V. H. Dalvi, S. V. Panse, J. B. Joshi, Solar thermal technologies as a bridge from fossil fuels to renewables, Nature Clim. Change 5 (11) (2015) 1007-1013.

[17] G. Ni, G. Li, S. V. Boriskina, H. Li, W. Yang, T. Zhang, G. Chen, Steam generation under one sun enabled by a floating structure with thermal concentration, Nat. Energy 1 (9) (2016) 1-7.

[18] P. Tao, G. Ni, C. Song, W. Shang, J. Wu, J. Zhu, G. Chen, T. Deng, Solar-driven interfacial evaporation, Nat. Energy 3 (12) (2018) 1031-1041.

[19] X. Liu, Y. Tian, F. Chen, A. Caratenuto, J. A. DeGiorgis, M. ELSonbaty, Y. Wan, R. Ahlgren, Y. Zheng, An easy-to-fabricate 2.5 D evaporator for efficient solar desalination, Adv. Funct. Mater. (2021) 2100911.

[20] L. Wang, Y. Dong, T. Yan, Z. Hu, A. A. Jelle, D. M. Meira, P. N. Duchesne, J. Y. Y. Loh, C. Qiu, E. E. Storey, et al., Black indium oxide a photothermal CO 2 hydrogenation catalyst, Nature Commun. 11 (1) (2020) 1-8.

[21] M. Caccia, M. Tabandeh-Khorshid, G. Itskos, A. Strayer, A. Caldwell, S. Pidaparti, S. Singnisai, A. Rohskopf, A. Schroeder, D. Jarrahbashi, et al., Ceramic-metal composites for heat exchangers in concentrated solar power plants, Nature 562 (7727) (2018) 406-409.

[22] A. P. Gonzalo, A. P. Marugán, F. P. G. Márquez, A review of the application performances of concentrated solar power systems, Appl. Energy 255 (2019) 113893.

[23] L. L. Baranowski, G. J. Snyder, E. S. Toberer, Concentrated solar thermoelectric generators, Energy Environ. Sci. 5 (10) (2012) 9055-9067.

[24] D. Kraemer, B. Poudel, H.-P. Feng, J. C. Caylor, B. Yu, X. Yan, Y. Ma, X. Wang, D. Wang, A. Muto, et al., High-performance flat-panel solar thermoelectric generators with high thermal concentration, Nature Mater. 10 (7) (2011) 532-538.

[25] M. Chirumamilla, A. Chirumamilla, Y. Yang, A. S. Roberts, P. K. Kristensen, K. Chaudhuri, A. Boltasseva, D. S. Sutherland, S. I. Bozhevolnyi, K. Pedersen, Large-area ultrabroadband absorber for solar thermophotovoltaics based on 3D titanium nitride nanopillars, Adv. Opt. Mater. 5 (22) (2017) 1700552.

[26] A. Lenert, D. M. Bierman, Y. Nam, W. R. Chan, I. Celanović, M. Soljačić, E. N. Wang, A nanophotonic solar thermophotovoltaic device, Nature Nanotechnol. 9 (2) (2014) 126-130.

[27] Y. Tian, X. Liu, A. Ghanekar, Y. Zheng, Scalable-manufactured metal-insulator-metal based selective solar absorbers with excellent high-temperature insensitivity, Appl. Energy 281 (2021) 116055.

[28] Y. Tian, L. Qian, X. Liu, A. Ghanekar, J. Liu, T. Thundat, G. Xiao, Y. Zheng, High-temperature and abrasion-resistant metal-insulator-metal metamaterials, Mater. Today Energy 21 (2021) 100725.

[29] H. Wang, H. Alshehri, H. Su, L. Wang, Design, fabrication and optical characterizations of large-area lithography-free ultrathin multilayer selective solar

[30] H.-X. Guo, C.-Y. He, X.-L. Qiu, Y.-Q. Shen, G. Liu, X.-H. Gao, A novel multilayer high temperature colored solar absorber coating based on high-entropy alloy MoNbHfZrTi: Optimized preparation and chromaticity investigation, Sol. Energy Mater. Sol. Cells 209 (2020) 110444.

[31] C.-Y. He, X.-H. Gao, D.-M. Yu, X.-L. Qiu, H.-X. Guo, G. Liu, Scalable and highly efficient high temperature solar absorber coatings based on high entropy alloy nitride AlCrTaTiZrN with different antireflection layers, J. Mater. Chem. A 9 (10) (2021) 6413-6422.

[32] C. He, X.-H. Gao, D.-M. Yu, S.-S. Zhao, G. Liu, et al., Toward high-temperature thermal tolerance in solar selective absorber coatings: Choosing high entropy ceramics HfNbTaTiZrN, J. Mater. Chem. A (2021).

[33] Y. Li, C. Lin, Z. Wu, Z. Chen, C. Chi, F. Cao, D. Mei, H. Yan, C. Y. Tso, C. Y. Chao, et al., Solution-processed all-ceramic plasmonic metamaterials for efficient solar-thermal conversion over 100-727° C., Adv. Mater. 33 (1) (2021) 2005074.

[34] J. Yang, H. Shen, Z. Yang, K. Gao, Air-stability improvement of solar selective absorbers based on TiW—SiO$_2$ cermet up to 800° C., ACS Appl. Mater. Interfaces 13 (12) (2021) 14587-14598.

[35] M. Bilokur, A. Gentle, M. D. Arnold, M. B. Cortie, G. B. Smith, Spectrally selective solar absorbers based on Ta: SiO2 cermets for next-generation concentrated solar-thermal applications, Energy Technol. 8 (7) (2020) 2000125.

[36] J.-P. Meng, Z. Li, Enhanced thermal stability of ZrAlSiN cermet-based solar selective absorbing coatings via adding silicon element, Mater. Today Phys. 9 (2019) 100131.

[37] J. Mandal, D. Wang, A. C. Overvig, N. N. Shi, D. Paley, A. Zangiabadi, Q. Cheng, K. Barmak, N. Yu, Y. Yang, Scalable, "Dip-and-Dry" fabrication of a wide-angle plasmonic selective absorber for high-efficiency solar-thermal energy conversion, Adv. Mater. 29 (41) (2017) 1702156.

[38] S. H. Tsao, D. Wan, Y.-S. Lai, H.-M. Chang, C.-C. Yu, K.-T. Lin, H.-L. Chen, White-light-induced collective heating of gold nanocomposite/bombyx mori silk thin films with ultrahigh broadband absorbance, ACS Nano 9 (12) (2015) 12045-12059.

[39] L. Zhou, Y. Tan, J. Wang, W. Xu, Y. Yuan, W. Cai, S. Zhu, J. Zhu, 3D self-assembly of aluminium nanoparticles for plasmon-enhanced solar desalination, Nature Photonics 10 (6) (2016) 393-398.

[40] P. Li, B. Liu, Y. Ni, K. K. Liew, J. Sze, S. Chen, S. Shen, Large-scale nanophotonic solar selective absorbers for high-efficiency solar thermal energy conversion, Adv. Mater. 27 (31) (2015) 4585-4591.

[41] V. Rinnerbauer, A. Lenert, D. M. Bierman, Y. X. Yeng, W. R. Chan, R. D. Geil, J. J. Senkevich, J. D. Joannopoulos, E. N. Wang, M. Soljačić, et al., Metallic photonic crystal absorber-emitter for efficient spectral control in high-temperature solar thermophotovoltaics, Adv. Energy Mater. 4 (12) (2014) 1400334.

[42] F. Cao, K. McEnaney, G. Chen, Z. Ren, A review of cermet-based spectrally selective solar absorbers, Energy Environ. Sci. 7 (5) (2014) 1615-1627.

[43] H. Wang, I. Haechler, S. Kaur, J. Freedman, R. Prasher, Spectrally selective solar absorber stable up to 9000 C for 120 h under ambient conditions, Sol. Energy 174 (2018) 305-311.

[44] H. W. Pickering, Characteristic features of alloy polarization curves, Corros. Sci. 23 (10) (1983) 1107-1120.

[45] J. Erlebacher, M. J. Aziz, A. Karma, N. Dimitrov, K. Sieradzki, Evolution of nanoporosity in dealloying, Nature 410 (6827) (2001) 450-453.

[46] R. Narayanasamy, T. Ramesh, M. Prabhakar, Effect of particle size of SiC in aluminium matrix on workability and strain hardening behaviour of P/M composite, Mater. Sci. Eng. A 504 (1-2) (2009) 13-23.

[47] G. Zhang, B. Xu, H. Chong, W. Wei, C. Wang, G. Wang, Effect of glyphosate on X-ray diffraction of copper films prepared by electrochemical deposition, RSC Adv. 9 (25) (2019) 14016-14023.

[48] S. A. Maier, H. A. Atwater, Plasmonics: Localization and guiding of electro-magnetic energy in metal/dielectric structures, J. Appl. Phys. 98 (1) (2005) 10.

[49] U. Kreibig, M. Vollmer, Optical Properties of Metal Clusters, Vol. 25, Springer Science & Business Media, 2013.

[50] S. Pillai, M. Green, Plasmonics for photovoltaic applications, Sol. Energy Mater. Sol. Cells 94 (9) (2010) 1481-1486.

[51] C. F. Guo, T. Sun, F. Cao, Q. Liu, Z. Ren, Metallic nanostructures for light trapping in energy-harvesting devices, Light. Sci. Appl. 3 (4) (2014) e161.

[52] X. Wang, Q. Liu, S. Wu, B. Xu, H. Xu, Multilayer polypyrrole nanosheets with self-organized surface structures for flexible and efficient solar-thermal energy conversion, Adv. Mater. 31 (19) (2019) 1807716.

[53] J. Li, M. Du, G. Lv, L. Zhou, X. Li, L. Bertoluzzi, C. Liu, S. Zhu, J. Zhu, Interfacial solar steam generation enables fast-responsive, energy-efficient, and low-cost off-grid sterilization, Adv. Mater. 30 (49) (2018) 1805159.

[54] L. Zhao, B. Bhatia, L. Zhang, E. Strobach, A. Leroy, M. K. Yadav, S. Yang, T. A. Cooper, L. A. Weinstein, A. Modi, et al., A passive high-temperature high-pressure solar steam generator for medical sterilization, Joule 4 (12) (2020) 2733-2745.

[55] R. Kaempener, Solar heat for industrial processes, in: IEA-ETSAP and IRENA Technology Brief E21, 2015.

[56] S. Dash, J. de Ruiter, K. K. Varanasi, Photothermal trap utilizing solar illumination for ice mitigation, Sci. Adv. 4 (8) (2018) eaat0127.

[57] Weatherground, Weather conditions, 2020, (Online; accessed 20 Jun. 2020), https://www.wunderground.com/history/monthly/us/ma/boston/KBOS/date/2020-6.

[58] I. McCue, E. Benn, B. Gaskey, J. Erlebacher, Dealloying and dealloyed materials, Annu. Rev. Mater. Res. 46 (2016) 263-286.

[59] X. Wu, G. He, Y. Ding, Dealloyed nanoporous materials for rechargeable post-lithium batteries, ChemSusChem 13 (13) (2020) 3287.

[60] Y. Tian, X. Liu, F. Chen, Y. Zheng, Perfect grating-mie-metamaterial based spectrally selective solar absorbers, OSA Contin. 2 (11) (2019) 3223-3239.

[61] ASTM, Solar insolation at AM1.5, 2020, https://www.nrel.gov/grid/solar-resource/spectra.html.

[62] E. D. Palik, Handbook of Optical Constants of Solids, Vol. 3, Academic Press, 1998.

The invention claimed is:

1. A method of producing a plasmonic-nanostructure, spectrally-selective solar absorber having high solar absorptance, low thermal emittance, and superior thermal stability, comprising the steps of:

providing an alloy structure containing a base metal and a copper alloying impurity, wherein copper has a weight percent concentration in the alloy of at least 0.25%; and applying an alkaline solution to a surface of the alloy structure to selectively dissolve base metal elements at the surface resulting in fabrication of porous copper nanostructures on the surface, the porous copper nanostructures exhibiting plasmonic resonance in the visible to near-infrared spectrum to scatter and absorb incident solar radiation, and the alloy structure underlying the porous copper nanostructures reflecting infrared radiation to suppress thermal emission.

2. The method of claim 1, wherein the solar absorber has a solar absorptance of about 0.94 at an angle of incidence of about 0° to 80°.

3. The method of claim 1, wherein the solar absorber has a solar absorptance of about 0.85 at an angle of incidence of about 80°.

4. The method of claim 1, wherein the solar absorber has infrared thermal emittance of about 0.03 at about 100° C. to suppress radiative heat loss.

5. The method of claim 1, wherein the solar absorber is configured for use in a photothermal conversion application.

6. The method of claim 5, wherein the photothermal conversion application comprises industrial heating, solar desalination, solar thermoelectrics, solar thermophotovoltaics, solar steam generation, or a solar concentrating power system.

7. The method of claim 1, wherein the base metal comprises aluminum, steel, or a super alloy.

8. The method of claim 1, wherein applying the alkaline solution comprises applying NaOH (aq) at 40° C. for 40 seconds to the surface of the alloy.

9. The method of claim 1, wherein the alloy structure comprises an alloy sheet.

10. The method of claim 1, wherein the copper nanostructures on the surface have a thickness of about 200 to 600 nm.

11. A plasmonic-nanostructure, spectrally-selective solar absorber having high solar absorptance, low thermal emittance, and superior thermal stability, comprising an alloy structure containing a base metal and a copper alloying impurity, wherein copper has a weight percent concentration in the alloy of at least 0.25%, said alloy structure having porous copper nanostructures on a surface thereof, the porous copper nanostructures exhibiting plasmonic resonance in the visible to near-infrared spectrum to scatter and absorb incident solar radiation, and the alloy structure underlying the porous copper nanostructures reflecting infrared radiation to suppress thermal emission, said copper nanostructures formed on said surface by applying an alkaline solution to the surface to selectively dissolve base metal elements at the surface resulting in fabrication of the copper nanostructures.

12. The solar absorber of claim 11, wherein the solar absorber has a solar absorptance of about 0.94 at an angle of incidence of about 0° to 80°.

13. The solar absorber of claim 11, wherein the solar absorber has a solar absorptance of about 0.85 at an angle of incidence of about 80°.

14. The solar absorber of claim 11, wherein the solar absorber has infrared thermal emittance of about 0.03 at about 100° C. to suppress radiative heat loss.

15. The solar absorber of claim 11, wherein the solar absorber is configured for use in a photothermal conversion application.

16. The solar absorber of claim 15, wherein the photo-thermal conversion application comprises industrial heating, solar desalination, solar thermoelectrics, solar thermophotovoltaics, solar steam generation, or a solar concentrating power system.

17. The solar absorber of claim 11, wherein the base metal comprises aluminum, steel, or a super alloy.

18. The solar absorber of claim 11, wherein applying the alkaline solution comprises applying NaOH (aq) at 40° C. for 40 seconds to the surface of the alloy.

19. The solar absorber of claim 11, wherein the alloy structure comprises an alloy sheet.

20. The solar absorber of claim 11, wherein the copper nanostructures on the surface have a thickness of about 200 to 600 nm.

* * * * *